US012489760B2

(12) United States Patent
Merchant et al.

(10) Patent No.: US 12,489,760 B2
(45) Date of Patent: Dec. 2, 2025

(54) OMNI CHANNEL AUTHENTICATION

(71) Applicant: Pindrop Security, Inc., Atlanta, GA (US)

(72) Inventors: Mohammedali Merchant, Wilmington, DE (US); Payas Gupta, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 197 days.

(21) Appl. No.: 18/235,321

(22) Filed: Aug. 17, 2023

(65) Prior Publication Data

US 2024/0064152 A1 Feb. 22, 2024

Related U.S. Application Data

(60) Provisional application No. 63/399,132, filed on Aug. 18, 2022.

(51) Int. Cl.
*H04L 9/40* (2022.01)
(52) U.S. Cl.
CPC ........ *H04L 63/123* (2013.01); *H04L 63/0861* (2013.01); *H04L 63/102* (2013.01)
(58) Field of Classification Search
CPC ........................... H04L 63/102; H04L 63/0861
USPC ............................................................ 726/4
See application file for complete search history.

(56) References Cited

U.S. PATENT DOCUMENTS

| | | | | |
|---|---|---|---|---|
| 10,681,207 | B1 * | 6/2020 | Johnson | H04M 3/42059 |
| 12,068,920 | B2 * | 8/2024 | Bhat | H04W 4/80 |
| 2020/0234297 | A1 * | 7/2020 | Murray | G06Q 20/3278 |
| 2021/0233541 | A1 * | 7/2021 | Chen | G10L 17/02 |
| 2021/0241776 | A1 * | 8/2021 | Sivaraman | G10L 21/038 |
| 2021/0344659 | A1 * | 11/2021 | Bloom | G06Q 20/227 |
| 2022/0392452 | A1 * | 12/2022 | Gupta | G06F 21/32 |

* cited by examiner

Primary Examiner — Liang Che A Wang
(74) Attorney, Agent, or Firm — Foley & Lardner LLP

(57) ABSTRACT

Embodiments include a computing device that executes software routines and/or one or more machine-learning architectures providing improved omni-channel authentication solutions. Embodiments include one or more computing devices that provide an authentication interface by which various communication channels may deposit contact or session data received via a first-channel session into a non-transitory storage medium of an authentication database for another channel to obtain and employ (e.g., verify users). This allows the customer to access an online data channel and enter the contact center through a telephony communication channel, but further allows the enterprise contact center systems to passively maintain access to various types of information about the user's identity captured from each contact channel, allowing the call center to request or capture authenticating information (e.g., voice biometrics) from both channels to employ authentication processes for one or both channels, such as voice biometrics authentication processes or other types of authentication functions.

20 Claims, 6 Drawing Sheets

OMNI CHANNEL AUTHENTICATION

CROSS-REFERENCE TO RELATED APPLICATION

This application claims priority to U.S. Provisional Application No. 63/399,132, filed Aug. 18, 2022, which is incorporated by reference in its entirety.

TECHNICAL FIELD

This application generally relates to systems and methods for managing security protocols and authentication operations in enterprise systems in which end-users access services or agents of the enterprise system through multiple communications channels or various type of communications devices.

BACKGROUND

Oftentimes, a user requires some assistance from a customer support specialist when operating or accessing a web application or mobile application of an enterprise's service (e.g., online banking application). This activity frequently involves two or more communication channels between the user and the enterprise, such as a data-related channel between the user's device and the enterprise server (for the application data) and a telephony channel for the conversation between the user and the support personnel. A problem arises in servicing the user when switching from one channel to another. Typically, when the user reaches a customer support agent, the support agent asks the user for identification information, verifies the user identity, performs certain processes to authenticate the user, and captures the reason for user's call. But when the communication channel changes from an online channel to a telephone channel (or vice-versa), the relevant enterprise systems might lose some or all of the identity, authentication, and context information collected for one or more channels associated with the user. This is an unpleasant, wasteful, and poor experience for the user.

Prior authentication management solutions implemented omni-channel solutions that perform certain identity management operations to maintain the authentication across channels. However, these prior approaches require an integrated suite of software solutions to properly interact with one another. These conventional approaches presume and require a common ecosystem of products, but that has limitations and are becoming increasingly impracticable in view of growing amounts of disparate technologies in the enterprise systems and employed at the client-side. These approaches operate within the confines of the common software ecosystem or suite of products to figure out how to do a handoff between a proprietary chatbot and proprietary voice-based webpage application. For example, the enterprise system would have to adopt and employ the same vendor's solutions for authentication and identity management across the communication channels (e.g., website or portal login solutions; chatbot solution; voice-based communication solution).

Demanding this level of integration raises several identifiable, expected, and unforeseen issues for the enterprise system. Migration to or adoption of new vendor solutions would be inhibited due to, for example, technical incompatibility, adaptation-development costs and time.

SUMMARY

Disclosed herein are systems and methods capable of addressing the above-described shortcomings and may also provide any number of additional or alternative benefits and advantages. Embodiments include a computing device that executes software routines and/or one or more machine-learning architectures providing improved omni-channel authentication solutions. Embodiments include one or more computing devices that provide an authentication interface by which various communication channels may deposit contact or session data received via a first-channel communication session into a non-transitory storage medium of an authentication database for another channel to obtain and employ (e.g., verify users). This allows the customer to access an online data channel and enter the contact center through a telephony communication channel, but further allows the enterprise contact center system to passively maintain access to various types of contextual information (e.g., identity, authentication, context) about the user's identity and other information about or captured from each contact channel, allowing the call center to request or capture authenticating information (e.g., voice biometrics) from both channels to employ authentication processes for one or both channels, such as voice biometrics authentication processes or other types of authentication functions.

In an embodiment, a computer-implemented method comprises receiving, by a computer, an auth-trigger notification from a data server of an enterprise service provider network, the auth-trigger notification including an intermediate identifier associated with an end-user and an enrolled phone number expected for a telephony device associated with the end-user; generating, by the computer, a session record including the intermediate identifier and the enrolled phone number; receiving, by the computer from a telephony server of the enterprise service provider network, inbound call data for an inbound call and an authentication request for an inbound call; generating, by the computer, an inbound voiceprint for the inbound call by applying a machine-learning architecture on the inbound call data; and generating, by the computer, a confidence score for the inbound call based upon a distance between a stored enrolled voiceprint associated with the intermediate identifier and the inbound voiceprint.

In another embodiment, a computer-implemented method comprises receiving, by a data server associated with an enterprise service provider network, authenticating information for an end-user from a client device via a data channel; transmitting, by the data server, to an authentication server associated with an authentication database, an auth-trigger notification including an intermediate identifier for the end-user associated with the data channel; receiving, by a telephony server associated with the enterprise service provider network, inbound call data from a caller device via a telephony channel; transmitting, by a telephony server associated with the enterprise service provider network, to the authentication server an authentication request including inbound call data received via the telephony channel; receiving, by the telephony server from the authentication server, an authentication response containing authentication results including a confidence score indicating a distance between an enrolled voiceprint associated with the intermediate identifier for the end-user associated with the data channel and an inbound voiceprint generated for the inbound call data received via the telephony channel.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
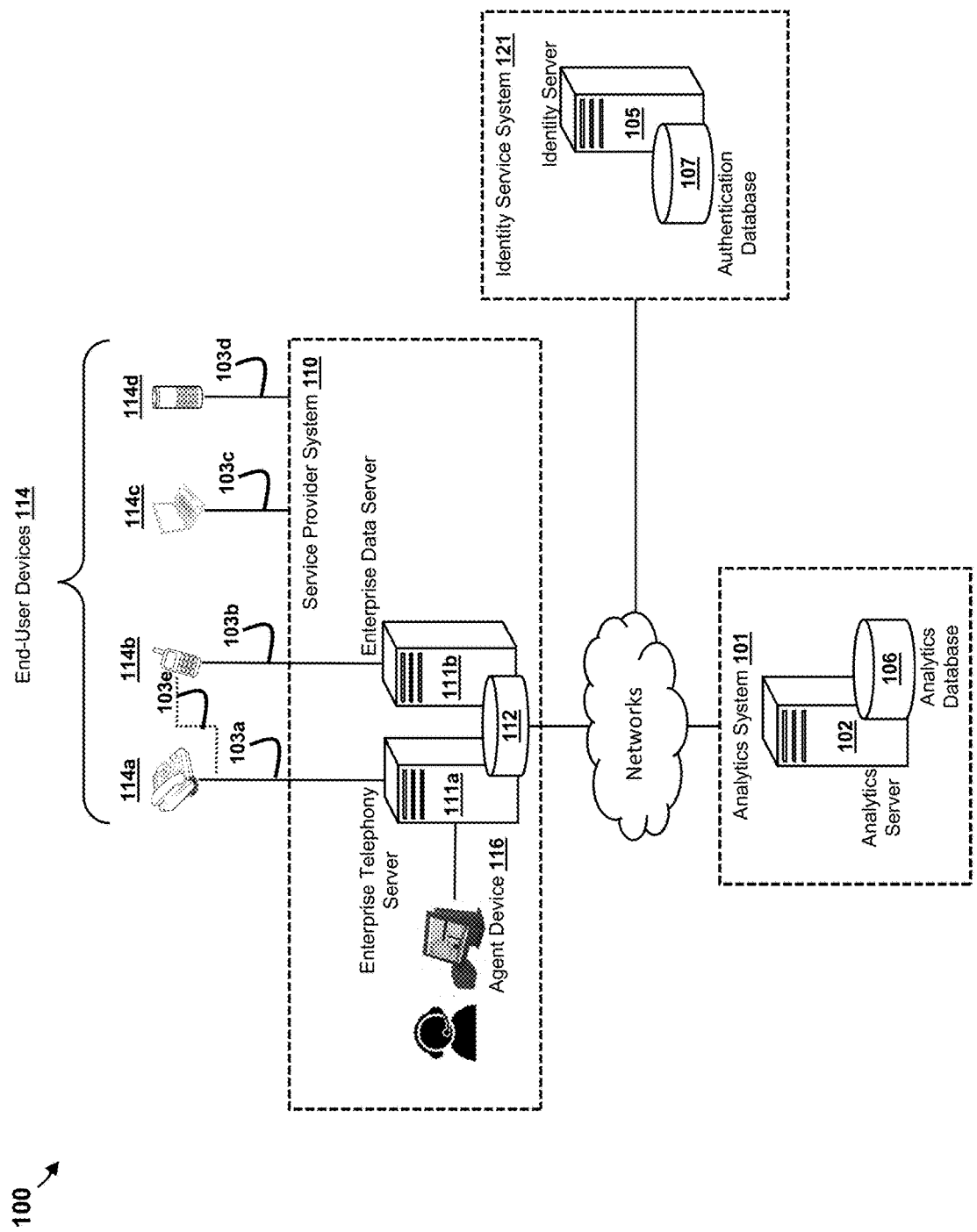
FIGS. 1A-1C show various arrangements of components of a system for receiving and analyzing voice biometrics and other types of information received via various types of communication channels, according to some embodiments.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1B:
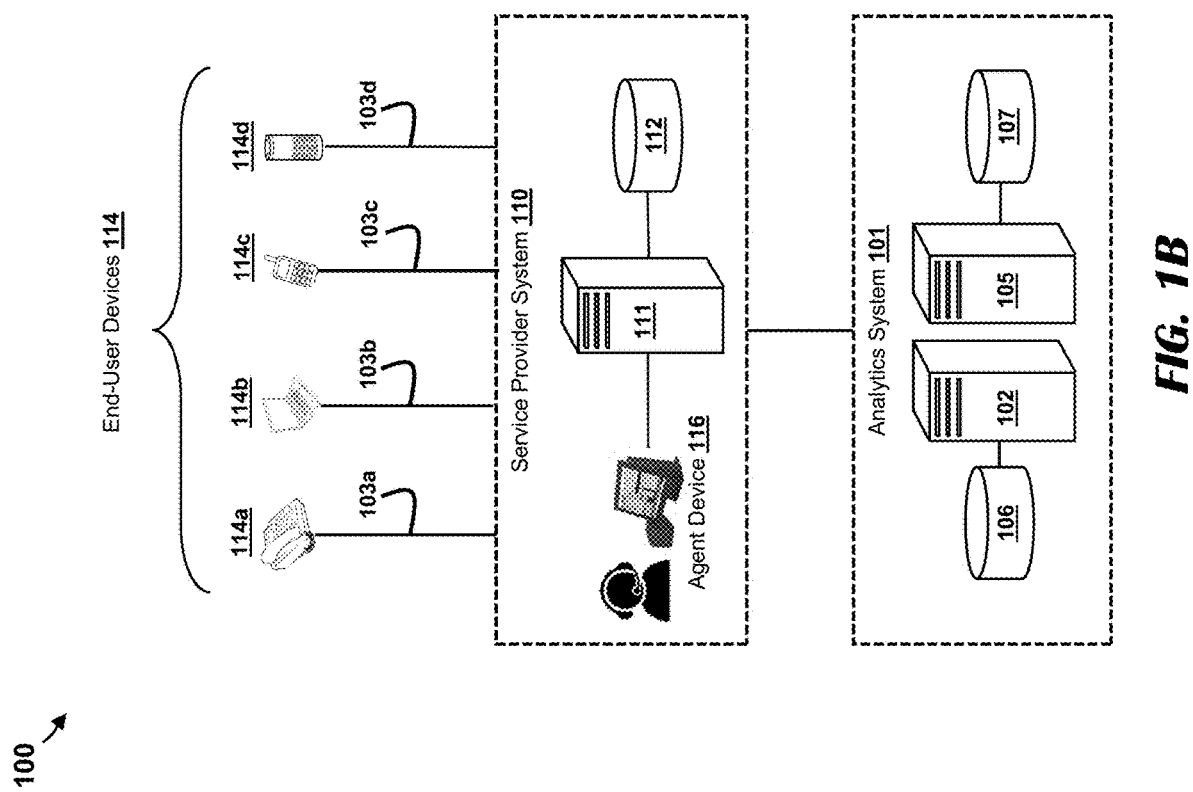
Figure 1C:
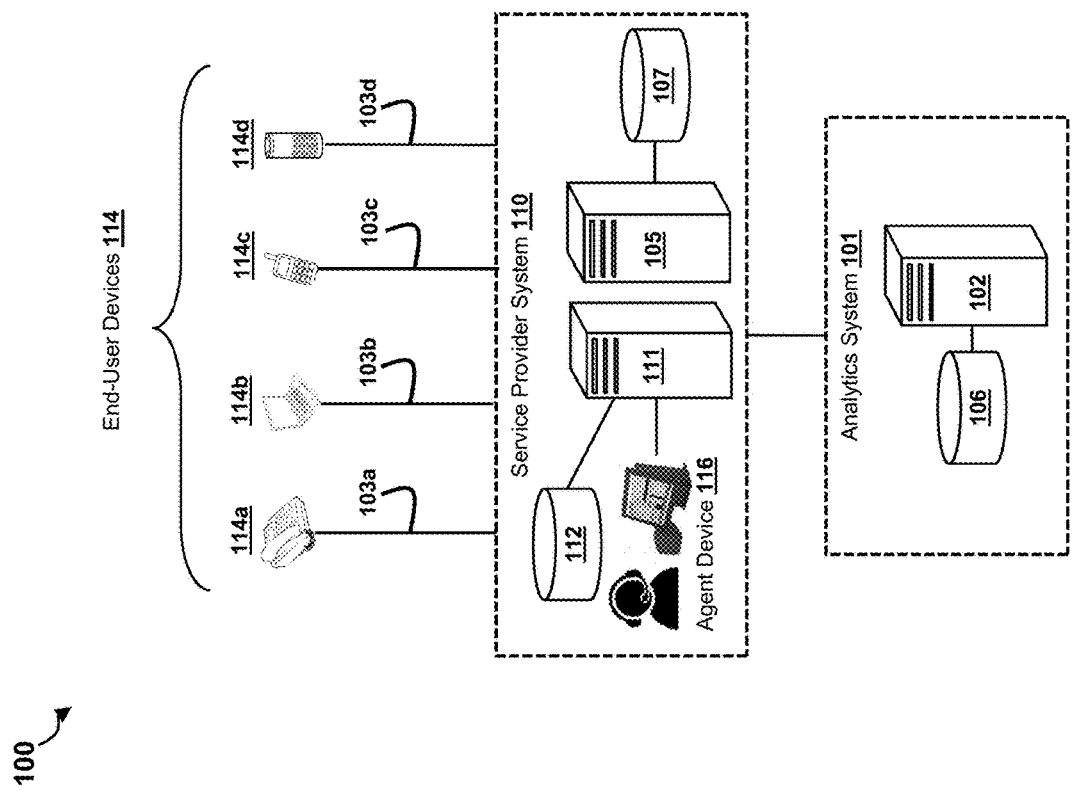

FIGS. 1A-1C show various arrangements of components of a system 100 for receiving and analyzing voice biometrics and other types of information received via various types of communication channels 103a-103d (collectively referred to as "channels 103" or a "channel 103"). The system 100 comprises an analytics system 101, one or more provider systems 110, and any number of end-user devices 114a-114d (collectively referred to as "end-user devices 114" or an "end-user device 114"). The system 100 further includes hardware and software components for an identity management service, shown as an identity server 105 in FIGS. 1A-1C.

The analytics system 101 includes hardware and software components for performing various analytics operations for recognizing and authenticating end-users or end-user devices 114 on behalf of the provider system 110. The analytics system 101 includes, for example, an analytics server 102 that performs the analytics operations and an analytics database 106 that stores various types of data (e.g., call data, enrolled user data, device data) referenced by the analytics server 102 when performing the analytics operations. The provider system 110 includes hardware and software components for hosting or providing the end-users various service offerings or customer support. The provider system 110 includes, for example, an enterprise telephony server 111a or enterprise data server 111b (collectively referred to as "provider servers 111" or a "provider server 111"), among other types of provider servers 111 or devices. For instance, the enterprise data server 111b includes hardware (e.g., processor) and software (e.g., webserver) for hosting or executing online data services, which an end-user accesses using a particular end-user device 114 having a web browser or other mobile or software application. The enterprise telephony server 111a, for example, includes call center management software for receiving inbound telephony calls placed by the end-user using a telephony device or telephony software (e.g., landline phone 114a, mobile device 114b). The enterprise telephony server 111a extracts various types of call data, generates user interface prompts, receives and processes responses to the prompts, and routes the calls to the appropriate call center agent or instructs another device (e.g., enterprise data server 111b) to perform a certain operation. The enterprise telephony server 111a could route the call and the call data to an agent device 116, which displays the call data to the agent.

In FIG. 1A, the system 100 comprises an identity service system 121 is a distinct enterprise infrastructure from both the enterprise infrastructures of the analytics system 101 and the provider system 110 and is often operated or managed by an identity and access management ("IAM" or "IdAM") service (e.g., Forge Rock®, Okta®). The identity service system 121 includes hardware and software components for performing various IAM operations on behalf of the provider system 110. As described herein, the analytics system 101 and identity service system 121 operate in concert to identify and authenticate the end-users for the provider system 110, particularly when the end-users access the provider system 110 via multiple channels 103. The identity service system 121 includes an identity server 105 that hosts and executes the various IAM operations using data inputs received from the analytics system 101 and provider system 110. In some cases, the identity service system 121 includes an authentication database 107, which stores various types of data about the end-users, the end-user devices 114, or channel sessions established between the end-user devices 114 and the provider servers 111.

In some embodiments, the analytics system 101 or the provider system 110 incorporate and perform various features and functions of the identity service system 121. In FIG. 1B, for example, the analytics system 101 includes the identity server 105 and the authentication database 107. In some implementations, the analytics server 102 incorporates and performs the features and functions of the identity server 105, such that the analytics system 101 need not include the identity server 105 distinct from the analytics server 102. Similarly, in some implementations, the analytics database 106 incorporates and performs the features and functions of the authentication database 107. As another example, FIG. 1C depicts another arrangement of the system 100 embodiment in which the provider system 110 includes the identity server 105 and the authentication database 107. As before, in some implementations, one or more provider servers 111 incorporates and performs the features and functions of the identity server 105, such that the provider system 110 need not include the identity server 105 distinct from the provider servers 111. Similarly, in some implementations, the provider database 112 incorporates and performs the features and functions of the authentication database 107.

Turning back to FIG. 1A, embodiments may comprise additional or alternative components or omit certain components from those of FIG. 1A, yet still fall within the scope of this disclosure. It may be common, for example, for the system 100 to include multiple provider systems 110, or for the analytics system 101 to have multiple analytics servers 102. Embodiments may include or otherwise implement any number of devices capable of performing the various features and tasks described herein. As an example, FIG. 1A shows the analytics server 102 as a distinct computing device from the analytics database 106, though in some configurations, the analytics database 106 may be integrated into the analytics server 102, such that these features are integrated within a single device.

The channels 103 facilitate communications between the provider system 110 and the end-user device 114, whenever the user accesses and interacts with the services or devices of the provider system 110 and exchanges various types of data or executable instructions. The channels 103 allow the end-user to access the services, service-related data, and/or user account data hosted by components of the provider system 110, such as the provider servers 111. Each channel 103 includes hardware and/or software components for hosting and conducting the communication exchanges between the provider system 110 and the end-user device 114 corresponding to the channel 103.

The end-user device 114 includes any type of electronic communications device capable of performing the various tasks or processes described herein. Using the end-user devices 114, the user accesses and interacts with the services and data hosted by the provider system 110 via the corresponding channels 103. Non-limiting examples of the end-user devices 114 include a landline phone 114*a*, a mobile device 114*b*, a computing device 114*c*, and an Internet-of-Things (IoT) device 114*d*. Other embodiments of the system 100 or the end-user device 114 may include other types of end-user devices 114. In some cases, the end-user device 114 includes a telephony-centric device (e.g., landline phone 114*a*, mobile device 114*b*) that the user operates to access the services of the provider system 110 through a telephony-centric channel 103 (e.g., landline channel 103*a*, mobile telephony channel 103*e*) which includes hardware and software of telephony networks and communications (e.g., telecommunication network, POTS, cellular telephone network). The telephony channel (e.g., landline channel 103*a* associated with the landline phone 114*a*) may include telephony and telecommunications protocols, hardware, and software capable of hosting, transporting, and exchanging audio data associated with telephone calls. Non-limiting examples of hardware components for telephony-centric networks include switches and trunks, among other additional or alternative hardware used for hosting, routing, or managing telephone calls, circuits, and signaling. Non-limiting examples of software and protocols of telephony-centric networks include Skype®, Zoom®, VoIP, SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

In some cases, the end-user device 114 includes a data-centric computing device (e.g., computing device 114*b*, mobile device 114*c*, IoT device 114*d*) that the user operates to access the services of the provider system 110 through a data-centric channel 103 (e.g., mobile data channel 103*b*, mobile channel 103*c*, IoT channel 103*d*), which includes hardware and software of computing data networks and communication (e.g., Internet, TCP/IP networks).

In some cases, the user operates the mobile device 114*b*, computing device 114*c*, or IoT device 114*d* to access the services of the provider system 110, such as a provider website, an online web-application ("web app"), or Voice-over-IP (VoIP) telephony software, as hosted on the enterprise data server 111*b*, where the end-user devices 114 access these services via corresponding types of data communication channels. Non-limiting examples of the data channels include the mobile data channel 103*b* associated with the mobile device 114*b*, the computing channel 103*c* associated with the computing device 114*c*, and the IoT channel 103*d* associated with the IoT device 114*d*. The online data channel may include hardware and software components of one or more public or private computing networks. Non-limiting examples of such networks include: Local Area Network (LAN), Wireless Local Area Network (WLAN), Metropolitan Area Network (MAN), Wide Area Network (WAN), and the Internet. The communication over the network may be performed in accordance with various communication protocols and software, such as Transmission Control Protocol and Internet Protocol (TCP/IP), User Datagram Protocol (UDP), IEEE communication protocols, Skype®, Zoom®, and VoIP, among others.

In some cases, the user operates a telephony communications device, such as a landline phone 114*a* or mobile device 114*b*, to interact with services of the provider system 110 by placing a telephone call to a call center agent or interactive voice response (IVR) system hosted by the enterprise telephony server 111*a*. The user operates the telephony device (e.g., landline phone 114*a*, mobile device 114*b*) to access the services of the provider system 110 via corresponding types of telephony communications channels, such as the landline channel 103*a* (for the landline phone 114*a*) or the mobile telephony channel 103*e* (for the mobile device 114*b*). For example, the mobile device 114*b* executes an app that accesses the data services hosted by the enterprise data server 111*b* via the mobile data channel 103*b*. The enterprise data server 111*b* returns an out-of-channel notification that prompts the mobile device 114*b* to place a telephone call to the enterprise telephony server 111*a* via the mobile telephony channel 103*e*.

In some instances, the user operates the computing device 114*c* or IoT device 114*d* as a telephony device that executes software-based telephony protocols (e.g., VoIP) to place a software-based telephone call through the corresponding channel (e.g., computing channel 103*c*, IoT channel 103*d*) to the enterprise telephony server 111*a* or enterprise data server 111*b*.

Notably, certain channels 103 of the system 100 represent data channels in some circumstances, but represent telephony channels in other cases. For example, the end-user executes software on the computing device 114*c* that accesses a web-portal or web-application hosted on the enterprise data server 111*b*, such that the computing channel 103*c* represents a data-centric channel carrying the data packets for the data service-related services. As another example, the end-user executes a telephony software (sometimes referred to as a "softphone") of the computing device 114*c* to place a telephone call to the enterprise telephony server 111*a*, such that the computing channel 103*c* represents a telephony channel carrying the data for the telephony-related services.

As mentioned, the system 100 comprises several enterprise network infrastructures associated with various service entities (e.g., analytics service entity, IAM service entity, service provider entity). The provider system 110 includes the enterprise computing network infrastructure managed by, operated by, owned by, or otherwise associated with the enterprise organization (e.g., retailers, banks, government entity) that functions as the provider of the various services to the end-users. The analytics system 101 includes an enterprise computing network infrastructure managed by, operated by, owned by, or otherwise associated with the analytics service that performs the various analytics operations on behalf of the provider systems 110, such as biometrics or device authentication operations or risk assessment operations. The identity service system 121 includes an enterprise computing network infrastructure managed by, operated by, owned by, or otherwise associated with the IAM service that performs the IAM operations on behalf of the provider systems 110.

The provider system 110 comprises the provider server 111, provider database 112, and the agent device 116, each of which may include or be hosted on any number of computing devices comprising a processor, non-transitory machine-readable storage media, and software and capable of performing various processes described herein.

The provider servers 111 host or provide the various services or support provided by the service provider to the end-users. The provider servers 111 transmit, receive, exchange, or otherwise communicate various types of data to, from, or with the end-user devices 114. The provider servers 111 comprise hardware and software components, configurations, and capabilities relative to the particular types of channels 103 or end-user devices 114 that the provider servers 111 will support.

The enterprise telephony server 111a comprises a processor, software, and non-transitory storage for receiving and capturing telephone call data via the telephony channel, among other operations. The enterprise telephony server 111a receives the call data for an inbound call from hardware that monitors or manages the telecommunications network data. For instance, a telecom monitoring device (not shown) situated at a trunk, exchange, or switch, may capture the call data of inbound telephone calls directed to the provider system 110 and forwards the call data to the enterprise telephony server 111a. The enterprise telephony server 111a executes the call management software, such as call center queue software or IVR software. During execution of the call management software, the enterprise telephony server 111a receives and captures the various inputs from the end-user device 114 (e.g., spoken inputs, keypad inputs) and performs certain downstream operation. The IVR software, for example, executes a series of preconfigured IVR interfaces based on the inputs from the end-user device 114, and may eventually route the inbound call to the agent. The enterprise telephony server 111a further transmits the inbound call data to the agent device 116, which presents some or all of the inbound call data to the agent.

The enterprise data server 111b comprises a processor, software, and non-transitory storage for receiving and capturing user data received from the end-user devices 114 via a data-communication channel, among other operations. The enterprise data server 111b hosts online data services accessible to the software (e.g., browser, software application) executed by the end-user device 114 via data-centric channels 103. For instance, the enterprise data server 111b executes software (e.g., webserver) for hosting web-based services executed by the enterprise data server 111b according to instructions from the end-user device 114 or hosting cloud-based services accessible to a software or app executed by the end-user device 114. As an example, the mobile device 114b or computing device 114c executes a browser to request and access a website having a chatbot service hosted on the enterprise data server 111b. When executing the software programming for the chatbot, the enterprise data server 111b receives inputs from the end-user device 114, determines the corresponding responsive output, and transmits the responsive output the end-user device 114 for display at a graphical user interface of the browser. In another example, the mobile device 114b executes a mobile app that accesses a portal or other service hosted by the enterprise data server 111b. The enterprise data server 111b receives user inputs from the mobile device 114b, determines a particular responsive output, and transmits the responsive output for display at the mobile app of the mobile device 114b.

In operation, the end-user device 114 transmits a request for the data-centric services over the data-communication channel 103 to the enterprise data server 111b. For instance, the computing device 114c issues a request for services by visiting a website or accessing a feature hosted by the enterprise data server 111b. For example, when the user attempts to access a bank account via banking portal for conducting a desired online transaction, the enterprise data server 111b prompts the user to enter authenticating data to log into the user's account. The enterprise data server 111b displays a portal GUI on end-user device 114, presenting a login prompt requiring the user to input the user authenticating data (e.g., account information, user identifier information) on the GUI. The user inputs the authenticating data and instructs the end-user device 114 to transmit the authenticating data to the enterprise data server 111b. When the enterprise data server 111b successfully authenticates the end-user device 114, the enterprise data server 111b establishes a data-related session or authenticated session for the end-user device 114 via the particular channel 103.

In some implementations, the enterprise data server 111b prompts the end-user device 114 to perform a multi-factor authentication operation. For instance, the enterprise data server 111b successfully authenticates the end-user and the end-user device 114, permitting the end-user device 114 to access the website services (e.g., banking web portal). When the enterprise data server 111b receives a request or instruction for a particular feature or operation (e.g., wire funds to another account), the enterprise data server 111b automatically executes the multi-factor authentication operation in which the enterprise data server 111b transmits a particular challenge prompt or code through another communication channel 103 (e.g., email to pre-stored email address, text message to pre-stored phone number, push notification to mobile device 114b).

The enterprise data server 111b includes software programming that determines or detects instances of a triggering request based on inputs or instructions received from the end-user device 114 or other preconfigured condition (e.g., temporal condition). In response to detecting the triggering request, the enterprise data server 111b determines that an ongoing session or exchange over the data-communication channel 103 between the enterprise data server 111b and end-user device 114 reached an endpoint or otherwise expired. The enterprise data server 111b then generates and transmits an out-of-band handling notification to the end-user device 114, indicating that the end-user should continue to interact with the service provider's services over a new communication channel 103.

Continuing with the prior banking services example, the enterprise data server 111b receives a request to initiate a stock purchase or close an account from the mobile device 114b via the mobile data channel 103b. The enterprise data server 111b determines that the requested operation is a type of request or instruction requiring the end-user to speak with a call center agent, according to preconfigured software code of the enterprise data server 111b. In this example, the enterprise data server 111b detects the requested operation as the triggering request that ends the operation process flow or data-channel session currently ongoing over the mobile data channel 103b. The enterprise data server 111b transmits the out-of-band handling notification to the mobile data channel 103b, prompting or otherwise instructing the end-user or the mobile data channel 103b to call the call center of the provider system 110 (e.g., place a telephone call via telephony channel 103). If the end-user wants to proceed, then the end-user operates the mobile device 114b to place a telephone call via the mobile telephony channel 103e.

In some implementations, the out-of-band notification includes machine-executable instructions that automatically instruct the software of the end-user device 114 to initiate software routines for contacting the provider system 110 via the new channel 103. In some implementations, the out-of-band notification includes machine-executable instructions for the end-user device 114 to generate a prompt or push notification for the graphical user interface of the end-user device 114, confirming whether the end-user would like the end-user device 114 to invoke the software routines of the end-user device 114 and place a telephone call via the telephony channel 103. In some implementations, the out-of-band notification includes machine-executable instructions for the end-user device 114 to generate a prompt or push notification for the graphical user interface of the end-user device 114 to inform the end-user to call the call center of the provider system 110.

The provider server 111 obtains certain types of authenticating data of the end-user, including a federated identifier (federated ID) uniquely identifying the end-user within the IAM processes and the ecosystem (e.g., other users, devices) of the system 100. The provider server 111 then preparers and transmits an auth-trigger notification, which may be any executable method or HTTP verb for sending or otherwise providing data updates or uploads to a web server (e.g., POST, PUT, PATCH). containing various types of session-related information, including the end-user's federated ID. The auth-trigger notification may further include, for example, an authentication level indicator (e.g., whether multi-factor authentication was successfully performed), a session ID, an expected phone number associated with the end-user user, and an enterprise phone number associated with the provider system 110. The provider server 111 transmits or otherwise communicates the auth-trigger notification according to any number of communication protocols. For example, in some cases, the auth-trigger notification is transmitted as a POST or PUT verb command according to the HTTP protocol. As another example, in some cases, the auth-trigger notification is generated by the provider server 111 (or administrator-operated client device) using a gRPC interface or similar RPC-style client interface and transmitted according to the corresponding gRPC protocol or the similar RPC protocol.

The provider server 111 obtains the certain types of data about the end-user or the end-user device 114 from, for example, user inputs received from the end-user device 114, metadata received in the data packets or signaling data from the end-user device 114, or data records for the end-user stored in one or more databases (e.g., authentication database 107, provider database 112) containing pre-stored end-user data, previously captured and stored during a registration or enrollment process for the end-user.

The provider server 111 transmits the auth-trigger notification to the analytics server 102 or the identity server 105, which then stores the data into the analytics database 106 or authentication database 107. For instance, the analytics server 102 generates a channel session record using the data received in the auth-trigger notification. The channel session record includes, for example, a database insert file (e.g., JSON object) that contains some or all of the data in the auth-trigger notification and instructions for the authentication database 107 to insert and store the channel session record into the non-transitory storage of the authentication database 107 for later reference.

When the provider server 111 (e.g., enterprise telephony server 111a) receives voice-related call data from the end-user device 114, the provider server 111 transmits an analytics request or authentication request to the analytics server 102, instructing the analytics server 102 to invoke various analytics operations on the call data received from the end-user device 114 for a given communication channel session (e.g., inbound call received via telephony channel). The analytics request may include information about one or more communication sessions (e.g., session IDs), the end-user (e.g., call data, voice recording), or the end-user device 114. In some implementations, the analytics server 102 invokes the voice biometrics operations immediately, such as extracting an inbound voiceprint vector using inbound audio data of the inbound call data, querying the analytics database 106 for an enrollee voiceprint vector, or generating confidence scores for the inbound call data based upon the relative distances between the inbound voiceprint and the enrollee voiceprints. As discussed further below, in some implementations the analytics server 102 performs only certain analytics operations or altogether delays the analytics operations until the analytics server 102 receives the federated ID information from the identity server 105. In this way, the analytics server 102 must compare only a subset of targeted enrolled voiceprints, rather than comparing the inbound voiceprint against any number of enrolled voiceprints stored in the analytics database 106.

The federated ID may be any arbitrary value generated by a computing device of the system 100 (e.g., analytics server 102, identity server 105, provider server 111). As a non-limiting example, when enrolling a new enrolled user, the analytics server 102 may assign a unique ID to the enrolled user data based on a random number generator. The analytics server 102 may then generate the federated ID for the enrolled user based upon a hash of the unique ID and a current timestamp of the analytics server 102. Additionally or alternatively, the federated ID may be provisioned and assigned by a computing device of the system 100 (e.g., analytics server 102, identity server 105, provider server 111) in accordance with various pre-configured parameters. In some implementations, the federated ID may be an intermediary arbitrary identifier that is mutually agreed upon by the analytics service, identity service, and provider system, but independent of the respective provisioning parameters or rule sets governing unique identifiers implemented by each of the analytics service, identity service, and provider system. The identity server 105 or other device of the system 100 may store and reference mappings or relationships between such federated ID and the unique IDs implemented by the respective computing architectures or sub-systems.

In some embodiments, the federated ID could be a unique ID that the identity service provisions and uses to identify an enrolled user. The identity server 105 may issue and provision the federated ID for the new enrolled user when that enrolled registers an account with the provider server 111 or enrolls with the analytics server 102. The identity server 105 may receive an instruction to generate the federated ID from the analytics server 102 or the provider server 111. Optionally, this instruction includes various types of information about the enrolled user. The identity server 105 generates the new federated ID according to any number of preconfigured parameters and stores the federated ID in one or more databases. In some cases, the identity server 105 may return the new federated ID to the analytics server 102 or the provider server 111.

In some embodiments, the federated ID could be a unique ID that the provider service or the analytics service provisions and uses to identify an enrolled user. The analytics server 102 or the provider server 111 may issue and provision a new unique ID for the new enrolled user when that enrolled registers an account with the provider server 111 or enrolls with the analytics server 102. The identity server 105 may receive an instruction to generate the federated ID from the analytics server 102 or the provider server 111, where the instruction indicates the unique ID assigned to the enrolled user and may include various additional types of information about the enrolled user. The identity server 105 generates the new federated ID according to any number of preconfigured parameters and stores the federated ID in one or more databases.

The provider server 111 receives an authentication results notification from the analytics server 102, indicating the results of the various operations for evaluating the trustworthiness or riskiness of the end-user device 114 attempting to communicate with the provider system 110. The authentication results include, for example, a confidence score (or threat score) indicating the distance (or similarity) between the enrolled voiceprint (or other types of enrolled vectors, such as deviceprints or behaviorprints) of the end-user indicated by the federated ID when compared against the inbound voiceprint (or other types of inbound vectors) generated for the inbound call data (or other types of inbound data). The authentication results may further indicate other information about the end-user or end-user device 114, such as the federated ID referenced by the analytics server 102 and authentication database 107.

Using the authentication results, the provider server 111 determines whether to permit or deny communication with the end-user device 114 through the later communication channel 103 (e.g., telephony channel 103). In some implementations, the provider server 111 programmatically determines whether to permit or deny communication with the end-user device 114 in accordance with certain pre-configured thresholds or functions. For example, the provider server 111 determines that the caller's voice received through the telephony channel 103 does not sufficiently match to the enrolled end-user's voice because the confidence score fails to satisfy a threshold score. In this example, the provider server 111 rejects (or terminates) the telephone call, or executes one or more mitigation operations (e.g., request additional authentication operations). Additionally or alternatively, the provider server 111 forwards the confidence score or other information from the authentication results to the agent device 116, allowing the agent device 116 to determine whether the voice-match is sufficient in view of various factors in the call data, available to the agent through the agent device 116. The agent device 116 may reject (or terminate) the telephone call or initiate the mitigation operations; or the agent device 116 may transmit instructions to the provider server 111 to reject (or terminate) the telephone call or initiate the mitigation operations.

The analytics system 101 comprises the analytics server 102 and the analytics database 106, each of which may be hosted on any number of computing devices comprising a processor, non-transitory machine-readable storage media, and software and capable of performing various processes described herein. The components of the analytics system 101, such as the analytics server 102, execute various processes using information extracted from the communication sessions with the user devices 114 via the various channels 103. The end-user user accesses the services of the provider system 110 (e.g., logs into the user's account) using one or more user devices 114 via the corresponding channels 103, and the provider servers 111 forward various types of communication data (e.g., call data) to the analytics server 102 for the analytics operations.

As an example, the user places a telephone call to the provider system 110 (e.g., banking system) to withdraw money from a savings account, using a telephony device (e.g., landline phone 114a, mobile device 114b) through a telephony channel 103 (e.g., landline channel 103a, mobile telephony channel 103e). The enterprise telephony server 111a (e.g., IVR software) or the agent device 116 enters into a provider database 112 or auth-trigger notification the contact data or session data about the end-user, end-user device 114, or operation services accessed by the end-user; examples of such data includes, for example, the account accessed by the end-user device 114, the time and date of the transaction, service requested (e.g., withdrawal) and related information (e.g., requested withdrawal amount), call data (e.g., recording of the call, device metadata, user's phone number), and federated ID indicated by the phone number, among others. The analytics server 102 stores this session data for the communication sessions into an analytics database 106 and performs various analytics operations, such as training or applying voice biometrics machine-learning architecture(s) on the data. When the end-user device 114 contacts the provider system 110 via one or more channels 103, the provider servers 111 capture and transmit the various types of contact data to the analytics server 102, among other devices (e.g., authentication database 107).

In some implementations, the analytics server 102 receives the auth-trigger notification from the provider server 111 related to the communication between a particular end-user device 114 and provider server 111 through a particular channel 103. The analytics server 102 then uses the data in the auth-trigger notification to generate and store a new session data record into the authentication database 107. In some cases, the analytics server 102 includes additional or alternative types of session data from the data in the auth-trigger notification.

As an example, the enterprise data server 111b captures certain types of data about the end-user and end-user device 114, while the enterprise data server 111b communicates with a mobile device 114b or computing device 114c via the corresponding data communication channel 103 (e.g., mobile data channel 103b, computing channel 103c). When the enterprise data server 111b prompts the end-user device 114 or the end-user to swap to a telephony channel 103 (e.g., landline phone 114a, mobile telephony channel 103e), the enterprise data server 111b sends the auth-trigger notification containing the various types of contact data or session data to the analytics server 102. Examples of data in the auth-trigger notification include the federated ID of the end-user, an authentication level, a session ID, and one or more phone numbers (e.g., expected phone number for the end-user, enterprise-generated phone number associated with the end-user). In this example, the analytics server 102 uses the information in the auth-trigger notification to generate the session record for the data-communication channel 103, and further includes other types of session data, such as an indication of an expiration or time-to-live (TTL) for the session record, indication of the type of authentication operations to perform on the expected new communication channel 103, among others.

When the provider server 111 receives the later communication via the new communication channel 103, the provider server 111 transmits an authentication request to the analytics server 102, instructing the analytics server 102 to perform the various analytics operations on the contact data (e.g., audio session ID, call data, end-user data, end-user device 114 data) captured by the provider server 111 from the communication received via the new communication channel 103. In some cases, the contact data includes the federated ID for the end-user device 114 or end-user associated with the new communication channel 103. In some cases, the contact data includes the inbound phone number (or other identifier) associated with a caller's federated ID.

Using this inbound phone number, the analytics server 102 obtains the session record stored in the authentication database 107 for the earlier communication channel 103. In some cases, the analytics server 102 queries the identity server 105 for the federated ID(s) associated with the inbound phone number. The analytics server 102 uses these federated ID(s) to query the authentication database 107 for the session data record(s) associated with the federated ID(s). In some cases, the analytics server 102 sends the inbound phone number to the identity server 105. The identity server 105 identifies the federated ID(s) associated with the inbound phone number, queries the authentication database 107 for the session data record(s) associated with the identified federated ID(s), and returns the identified session records associated with the federated ID(s) to the analytics server 102. In this way, the analytics server 102 accesses the federated IDs for the inbound caller and for the end-user involved with the session record generated for the initial communication channel 103.

The analytics operations executed by the analytics server 102 include training and applying one or more machine-learning architectures on the contact data to determine the similarities or distances between inbound contact data, stored session data in the authentication database 107, and/or stored enrolled data in the analytics database 106. For instance, the analytics server 102 applies a speaker recognition machine-learning architecture on the call data of the inbound call to extract an inbound voiceprint for the inbound caller. Using the federated ID in the earlier session record, the analytics server 102 queries the analytics database 106 for an enrolled voiceprint for an enrolled end-user. The machine-learning architecture returns a confidence score (or risk score) indicating the similarity (or distance) between the inbound voiceprint and the enrolled voiceprint. In this way, the system 100 provides multiple layers of failure for fraudsters attempting to coopt the contact at the switch to the new communication channel 103. For example, if the inbound contact data does not include sufficient data for obtaining the federated IDs, then the analytics server 102 would be unable to retrieve the session data record and/or the enrolled voiceprint. As another example, if the fraudster spoofs the data associated with the federated IDs or manages to access the end-user devices 114, the fraudster would still need to satisfy the voice biometrics operations. As a matter of user experience, the user's switch from a first channel 103 (e.g., mobile data channel 103b) to a second channel 103 (e.g., mobile telephony channel 103e) is frictionless, due to the system 100 referencing data storage locations based on passing the federated ID without necessarily requiring further inputs from the end-user, though further or different inputs may be desirable in certain circumstances.

The analytics database 106 and provider database 112 include various types of enrolled data associated with the enrolled users of the provider system 110. This includes data records containing various types of enrolled data used for authenticating the registered users or tracking operations, features, and behaviors of the registered users. The enrolled data includes various enrolled feature vectors, as generated by the layers of the machine-learning architecture executed by the analytics server 102. Non-limiting examples of the enrolled feature vectors include voiceprints, deviceprints (sometimes called "phoneprints"), behaviorprints, deepfake detection (sometimes referred to as "liveness detection"), and the like. The analytics database 106 or provider database 112 store the enrolled data for the enrolled users with the corresponding federated IDs of the enrolled users, such that the analytics server 102 or identity server 105 uses the user's federated ID to query and retrieve particular user's voiceprint or other enrolled data for the authentication operations.

The identity service system 121 comprises the identity server 105 and the analytics database 106, each of which may be hosted on any number of computing devices comprising a processor, non-transitory machine-readable storage media, and software and capable of performing various processes described herein. The components of the analytics system 101, such as the analytics server 102, execute various processes using information extracted from the communication sessions with the user devices 114 via the various channels 103. The end-user user accesses the services of the provider system 110 (e.g., logs into the user's account) using one or more user devices 114 via the corresponding channels 103, and the provider servers 111 forward various types of communication data (e.g., call data) to the analytics server 102 for the analytics operations.

As an example, the user places a telephone call to the provider system 110 (e.g., banking system) to withdraw money from a savings account, using a telephony device (e.g., landline phone 114a, mobile device 114b) through a telephony channel 103 (e.g., landline channel 103a, mobile telephony channel 103e). The enterprise telephony server 111a (e.g., IVR software) or the agent device 116 enters into a provider database 112 or auth-trigger notification, contact data or session data about the end-user, end-user device 114, or the operation services accessed by the end-user; examples of such data includes, for example, the account accessed by the end-user device 114, the time and date of the transaction, service requested (e.g., withdrawal) and related information (e.g., requested withdrawal amount), call data (e.g., recording of the call, device metadata, user's phone number), and federated ID indicated by the phone number, among others. When the end-user device 114 contacts the provider system 110 via one or more channels 103, the provider servers 111 capture and transmit the various types of contact data to the analytics server 102, among other devices (e.g., authentication database 107). In some cases, the provider server 111 or the analytics server 102 obtain the federated ID (or other types of information) for the end-user associated with the initial communication channel 103 session (e.g., mobile data channel 103b) by querying the identity server 105 or authentication database 107 using the contact data (e.g., expected or enrolled phone number, user credentials, end-user device IDs) captured by the provider server 111 in the initial channel 103.

In some implementations, when the provider server 111 detects the triggering request, the provider server 111 generates and transmits the auth-trigger notification to the identity server 105. In such implementations, the identity server 105 receives the auth-trigger notification from the provider server 111 related to the communication between the particular end-user device 114 and the provider server 111 through the particular channel 103. The identity server 105 then uses the contact data in the auth-trigger notification (e.g., federated ID, authentication level, session ID, phone numbers) to generate and store a new session data record in the authentication database 107.

In some cases, the identity server 105 includes additional or alternative types of session data from the data in the auth-trigger notification. As an example, the enterprise data server 111b captures certain types of data about the end-user and end-user device 114, when the enterprise data server 111b communicates with the mobile device 114b or computing device 114c via the corresponding data communication channel 103 (e.g., mobile data channel 103b, computing channel 103c). When the enterprise data server 111b prompts the end-user device 114 or the end-user to swap to a telephony channel 103 (e.g., landline phone 114a, mobile telephony channel 103e), the enterprise data server 111b sends the auth-trigger notification containing the various types of contact data or session data to the identity server 105. Examples of data in the auth-trigger notification include the federated ID of the end-user, an authentication level, a session ID, and one or more phone numbers (e.g., expected phone number for the end-user, enterprise-generated phone number associated with the end-user). In this example, the identity server 105 uses the information in the auth-trigger notification to generate the session record for the data-communication channel 103, and further includes other types of session data, such as an indication of an expiration or time-to-live (TTL) for the session record, indication of the type of authentication operations to perform on the expected new communication channel 103 (e.g., mobile data channel 103b), among others.

When the provider server 111 receives the later communication via the new communication channel 103, the provider server 111 transmits the authentication request to the analytics server 102, instructing the analytics server 102 to perform the various analytics operations on the contact data (e.g., audio session ID, call data, end-user data, end-user device 114 data) captured by the provider server 111 from the communication received via the new communication channel 103. In some cases, the contact data includes the federated ID for the end-user device 114 or end-user associated with the new communication channel 103. In some cases, the contact data includes the inbound phone number (or other identifier) associated with a caller's federated ID.

Using this inbound phone number, the analytics server 102 obtains the session record stored in the authentication database 107 for the earlier communication channel 103. In some cases, the analytics server 102 queries the identity server 105 for the federated ID(s) associated with the inbound phone number. The analytics server 102 uses these federated ID(s) to query the authentication database 107 for the session data record(s) associated with the federated ID(s). In some cases, the analytics server 102 sends the inbound phone number to the identity server 105. The identity server 105 identifies the federated ID(s) associated with the inbound phone number, queries the authentication database 107 for the session data record(s) associated with the identified federated ID(s), and returns the identified session records associated with the federated ID(s) to the analytics server 102. In this way, the analytics server 102 accesses the federated IDs for the inbound caller and for the end-user involved with the session record generated for the initial communication channel 103.

In FIG. 1B, the system 100 omits the distinct infrastructure for the identity service system 121 and the analytics system 101 incorporates the components and operations of the identity service system 121, including the operations of the identity server 105 and authentication database 107. The identity server 105 executes the IAM operations in concert with the analytics server 102, where the hardware and/or software performing the IAM operations are developed by the IAM service entity or homegrown by the analytics system 101. The system 100 and related components are similar to those described with respect to FIG. 1A and need not be described again with respect to FIG. 1B. Embodiments may comprise additional or alternative components or omit certain components from those of FIGS. 1B, yet still fall within the scope of this disclosure. It may be common, for example, for the system 100 to include multiple provider systems 110, or for the analytics system 101 to have multiple analytics servers 102. Embodiments may include or otherwise implement any number of devices capable of performing the various features and tasks described herein. As an example, FIG. 1C shows the analytics server 102 as a distinct computing device from the analytics database 106, though in some configurations, the analytics database 106 may be integrated into the analytics server 102, such that these features are integrated within a single device. FIG. 1B shows the analytics server 102 as a distinct computing device from the identity server 105, though the analytics server 102 and the identity server 105 may be integrated into the same computing devices.

In FIG. 1C, the system 100 omits the distinct infrastructure for the identity service system 121 and the provider system 110 incorporates the components and operations of the identity service system 121, including the operations of the identity server 105 and authentication database 107. The identity server 105 executes the IAM operations in concert with the analytics server 102, where the hardware and/or software performing the IAM operations are developed by the IAM service entity or homegrown by the provider system 110. The system 100 and related components are similar to those described with respect to FIGS. 1A-1B and need not be described again with respect to FIG. 1C. Embodiments may comprise additional or alternative components or omit certain components from those of FIGS. 1C, yet still fall within the scope of this disclosure. It may be common, for example, for the system 100 to include multiple provider systems 110, or for the analytics system 101 to have multiple analytics servers 102. Embodiments may include or otherwise implement any number of devices capable of performing the various features and tasks described herein. As an example, FIG. 1C shows the analytics server 102 as a distinct computing device from the analytics database 106, though in some configurations, the analytics database 106 may be integrated into the analytics server 102, such that these features are integrated within a single device. As another example, FIG. 1C shows the provider server 111 and identity server 105 as distinct computing devices, though in some configurations, the provider server 111 and identity server 105 may be integrated into the same computing devices.

Figure 2A:
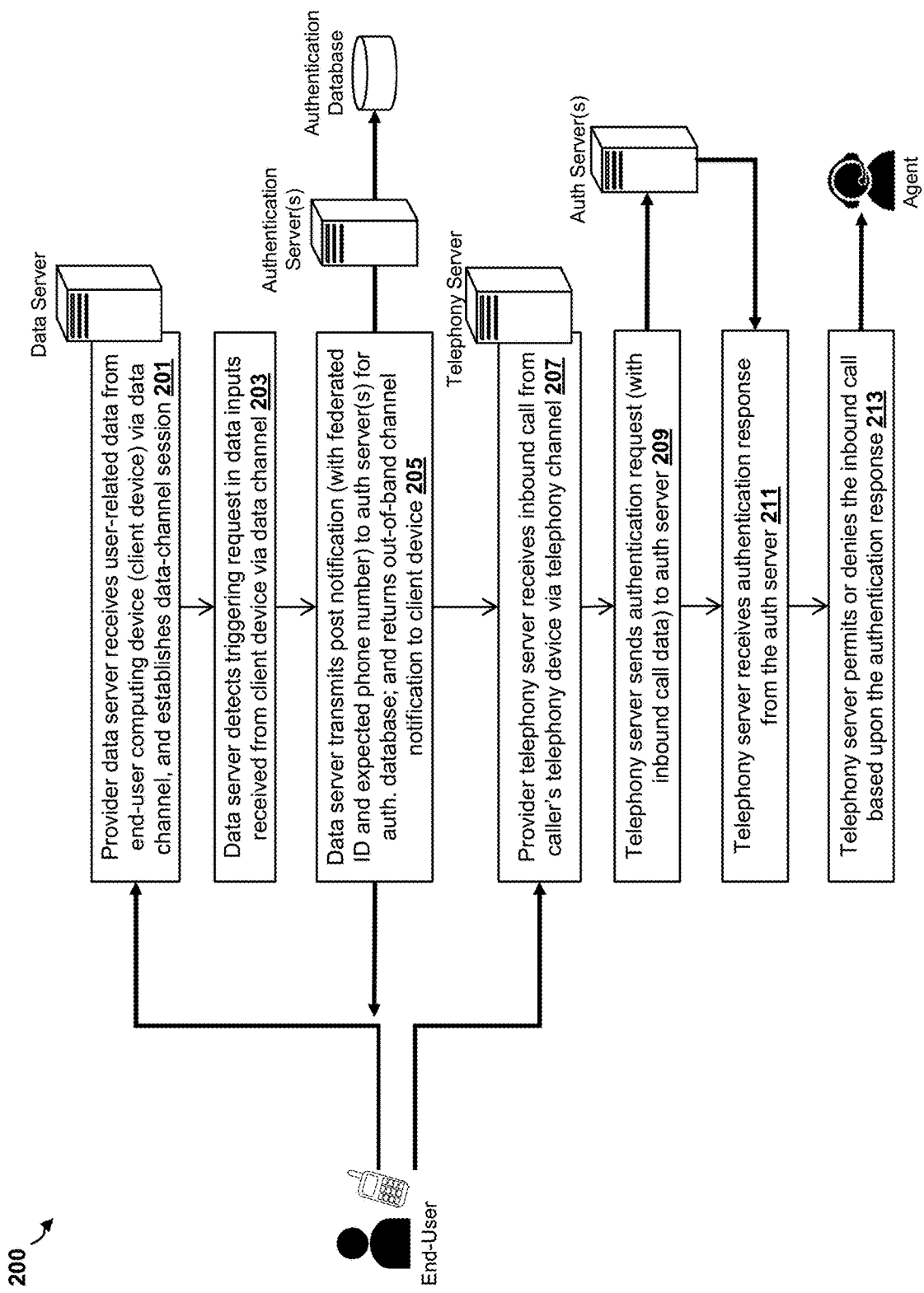
FIG. 2A shows certain operations of the process as performed by a provider data server (e.g., enterprise data server) and provider telephony server (e.g., enterprise telephony server) of a server provider system, according to some embodiments.
Figure 2B:
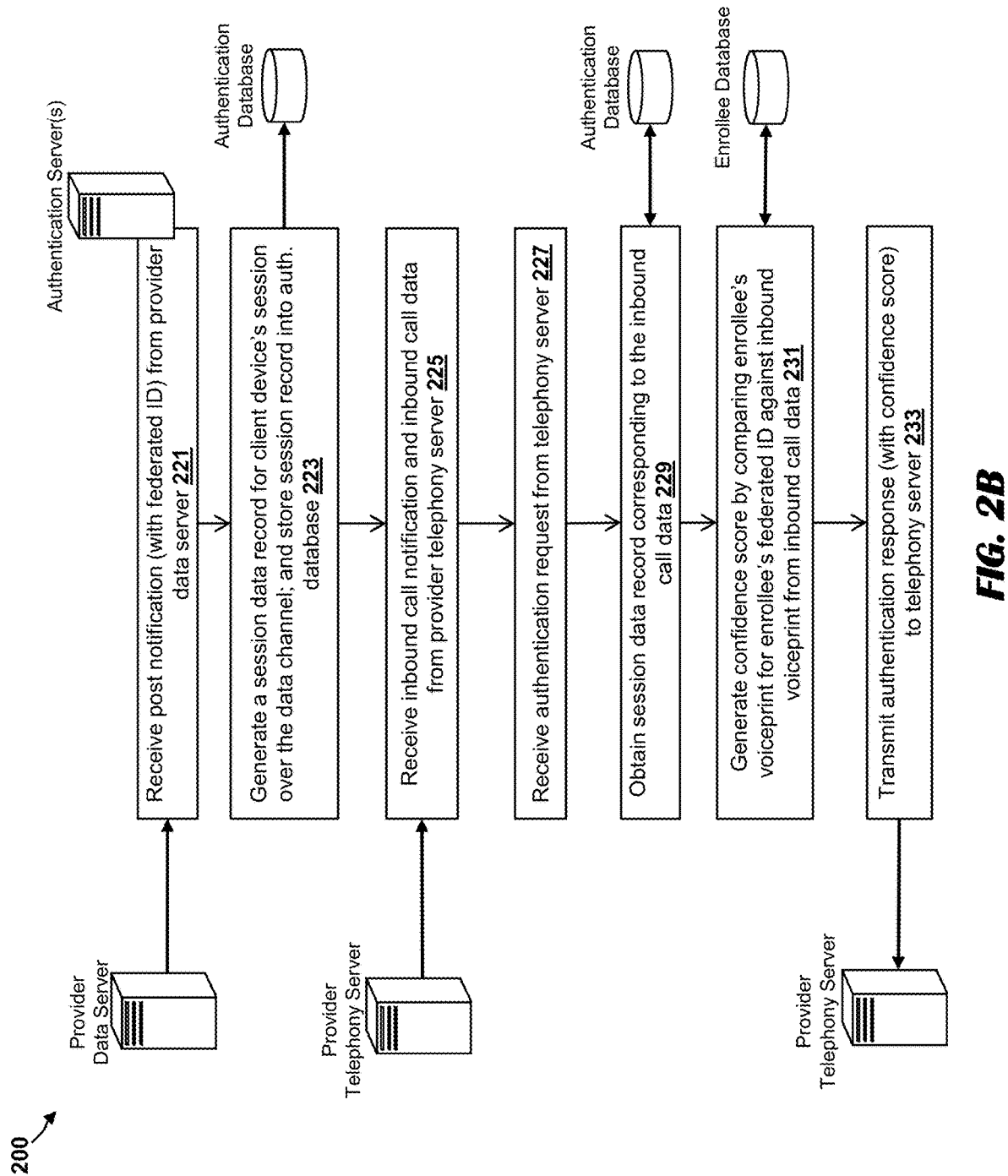
FIG. 2B shows certain operations of the process as performed by one or more authentication servers, according to some embodiments.

FIGS. 2A-2B include flowcharts showing operations of a process 200 of identity management for an end-user accessing a provider system via multiple communication channels and using corresponding communication devices. As mentioned, a federated ID may include any form of intermediate ID referenced by the various devices of the process 200. For ease of understanding, certain features and functions involve a federated ID, though embodiments may include any form of intermediate arbitrary ID that each device of the system is preconfigured to ingest and map to another known unique ID.

FIG. 2A shows certain operations of the process 200 as performed by a provider data server (e.g., enterprise data server 111b) and provider telephony server (e.g., enterprise telephony server 111a) of a server provider system.

In the example process 200, the provider data server communicates with end-user client devices (e.g., mobile device 114b, computing device 114c) through corresponding data communication channels (e.g., mobile data channel 103b, computing channel 103c). The provider telephony server communicates with an end-user telephony device (e.g., landline phone 114a, mobile device 114b) through corresponding data communication channels (e.g., landline channel 103a, mobile telephony channel 103e). The example process 200 describes operations for moving from a data channel (as a first channel) to a telephony channel (as a second channel), though embodiments are not so limited.

In operation 201, the provider data server receives various types of data and metadata from the client device via the data channel and establishes data-channel session with client device. The data server receives a data communication from the device of the end-user over the data channel, when the client device requests access to a service of the provider system. The provider server receives the service request through a particular communication channel that logically and/or physical connects the service and the computing device.

For example, the end-user instructs the client device to invoke and execute a mobile app associated with the provider service. The mobile app or data server receives and evaluates authenticating data (e.g., credentials, biometrics) inputted by the user. In a single-factor authentication configuration, the user successfully logs into the mobile app when the credentials supplied match to expected login credentials. In this way, the mobile app and the provider server confirmed the identity of the user, at least to a certain degree of authentication level, allowing the provider system and authentication server to store identity-related information in an authentication database for later authenticating the end-user through another channel (e.g., telephony channel, different data channel).

In operation 203, the data server receives data inputs from the client device via the data channel and detects a triggering request according to preconfigured triggering instructions in the software programming (e.g., triggering inputs, threshold values, temporal thresholds or expiration timing). Due to detecting the triggering request, the data server determines that an ongoing operational flow or service request (e.g., ongoing chatbot conversation, request to withdraw or transfer funds, generate or update user data) reaches an endpoint requiring the end-user to switch to another communication channel. The user's journey (operational flow of the session) of accessing and interacting with the provider's services begins when the mobile app or browser of the client device accesses and invokes the services or features executed by the data server (as in operation 201). The client device and the data server generate and communicate messages over the data channel, according to user inputs, software programming of the client device, and software programming of the data server. At some point in the journey, the data server receives instructions or inputs from the client device that the data server detects as the triggering request for a particular function or operation, representing an endpoint in the end-user and client device's journey through the particular data channel for the desired operation or service.

As an example, the data server includes webserver software that hosts a provider webpage and executes a chatbot program, accessed by the client device. The client device sends the various user inputs as entered into a chatbot user interface, and the chatbot determines how to respond or executes programming for a particular operation in accordance with the user inputs. Eventually, the data server detects the triggering request, occurring when the data server determines that the user input requested a response or operation that requires the user to contact the call center and speak with a call center agent.

As another example, the service provider is a bank and the data server invokes or performs operations (e.g., funds transfer, check account balance) according to the user inputs received from the client device (e.g., mobile app, web browser). The data server may present the account balance in response to an input request a balance check. The programming of the data server determines that the user has not accessed the user account for a login-threshold period of time and cannot request certain features (e.g., stock purchase, funds transfer) through the data server. The data server detects the triggering request from the client device, occurring when the data server determines that the login-threshold period elapsed and the end-user requested one or more of the certain features.

In operation 205, the data server generates an auth-trigger notification containing a federated ID and expected phone number associated with the end-user. The data server transmits the auth-trigger notification to one or more authentication servers (e.g., analytics server 102, identity server 105) that store the data into an authentication database as a session record associated with the data channel communication session (between the client device and the data server). Contemporaneously, the data server returns an out-of-band channel notification to the client device in response to the detecting the triggering request.

The data server or authentication server determines the federated ID according to the successful authentication of the end-user through the data channel or by retrieving relevant data records for the authenticated user from one or more databases (e.g., provider database 112, analytics database 106). In some cases, using the authenticating data obtained with the user's successful login (in operation 201), among other possible types of metadata or inputs, the data server or authentication server executes the IAM operations or services executed by the authentication server or queries the databases, to identify and retrieve the federated ID of the end-user for the communication session for the given channel.

For example, in response to detecting the triggering request, the data server transmits an auth-trigger notification indicating a registered ANI or phone number associated with the user. For instance, the auth-trigger notification indicates that the call center should expect a call from "(310) 555-1212" and "ID_100" identifying the end-user. Using the auth-trigger notification information, the authentication server then generates a database object file (e.g., JSON file) for a new channel session record, and stores the session record into the authentication database. In later operations, the authentication server references the federated ID ("ID_100") of the end-user to identify and authenticate a caller as the end-user via the telephony channel, when that caller purports to be or otherwise should be associated with the same federated ID ("ID_100"), and thus should have the same biometrics (e.g., enrolled voiceprint) stored in a database referenced by the analytics operations.

In some implementations, if the client device and data server perform multi-factor authentication operations. For example, the data server may determine that the requested service or feature requires stepped-up authentication or the user's profile indicates that the user enabled a multi-factor authentication preference in the user's account data. In this example, when the customer reaches the endpoint in the journey and successfully satisfies the multi-factor authentication requirement, then the data server includes an authentication level ("MFA: 'True'") in the auth-trigger notification information.

Continuing with operation 205, as mentioned, the data server returns an out-of-band handling notification to the client device, indicating that end-user has reached the endpoint of the journey via the data channel and the end-user needs to contact the provider through another communication channel, such as a place a telephone call through the telephony channel. In some instances, the out-of-band notification includes instructions for the client device to present in present a graphical user interface prompt for the end-user to place the telephone call to the contact call center through the telephony channel. In some instances, the out-of-band notification includes instructions for the client device to invoke a telephony application or function of the client device.

In operation 207, the provider telephony server receives inbound call data for an inbound call, originated from a caller's telephony device via the telephony channel. The inbound call data includes various types of data for identifying the end-user, the end-user's telephony device, and for presenting to the call center agent to service the end-user's service requests. Non-limiting examples of the inbound call data includes the inbound phone number (or ANI) of the inbound caller's telephony device; an audio recording or acoustic data containing samples of the caller's voice; user inputs to IVR software executed by the telephony server; and metadata associated with or indicating the caller's telephony device, among other potential types of data.

In some cases, the telephony server receives the inbound call data from a monitoring device that monitors traffic over the telephony communication channels and forwards the inbound call data to the telephony server of the provider system. In such cases, the telephony channels include hardware and software components of telecommunications networks according to telephony-related protocols (e.g., trunks, exchanges, switches, SIP, SS7, POTS, DNIS, ISDN, PSTN, VoIP), where the telephony device includes a landline or mobile telephone. In some cases, the telephony server receives telephony channels include hardware and software components for computer-telephone integration (CTI) or digital telephony protocols (e.g., routers, switches, TCP/IP, VoIP), where the telephony device includes a computer or mobile device executing telephony software, softphone software, teleconferencing software, or integrated telephony software routines of the mobile application.

In operation 209, the telephony server sends an authentication request (with inbound call data) to the authentication server, which performs the IAM operations and analytics operations using the inbound call data. The authentication server queries the authentication database and retrieves the session record (for the user's session through the data channel), and receives the various types of inbound call data from the telephony channel. The IAM operations of the authentication server determine the user federated ID indicated by the client device and/or the user federated ID indicated by the telephony device. The analytics operations of the authentication server applying machine-learning architecture operations against the inbound call data for comparison against enrolled data associated with the federated ID expected from the session record.

The IAM operations include, for example, identifying the federated ID for the inbound user indicated by the inbound data. The IAM operation receives the authentication request containing the phone number, and queries the authentication database (or other databases) for the federated IDs associated with the phone numbers or ANIs in the authentication request. For example, the session record stored into the authentication includes the federated ID ("ID_100") and expected phone number ("(310) 555-1212"). In this example, the telephony server includes the inbound phone number ("(310) 555-1212") in the authentication request submitted to the authentication server. Using the inbound phone number ("(310) 555-1212"), the authentication database returns each of the database records and federated IDs (e.g., "ID_100") associated with the inbound phone number, which in this example, is the same federated ID ("ID_100") in the session record generated for the data channel (in operation 205).

The IAM operations return the selected federated ID ("ID_100"), among other potential types of data, to the analytics operations. The analytics operations, in turn, query the databases (e.g., analytics database) using the selected federated ID to retrieve various types of enrolled data for authenticating the caller over the telephony channel. The analytics operations retrieve the enrolled vectors and/or enrolled data associated with the selected federated ID against corresponding inbound vectors and/or inbound data generated for the inbound call data or received in the authentication request.

The analytics operations include, for example, executing one or more machine-learning architecture layers for extracting certain types of embedding feature vectors for registered enrolled users and inbound contact data from users. The analytics operations apply the layers of the machine-learning architecture on the contact data to extract certain types of features and corresponding types of feature vectors, such as voiceprints, browserprints (sometimes referred to as "browser fingerprints"), or deviceprints (sometimes referred to as "phoneprints"). As an example, the contact data comprises call data that includes voice samples, where the layers of the machine-learning architecture extract low-level acoustic features (e.g., MFCCs) from the voice sample data. In this example, the machine-learning architecture extracts a voiceprint based on the features extracted from the voice sample data. As another example, the contact data comprises metadata associated with the web browser of the client device of the end-user. In this example, the layers of the machine-learning architecture extract various types of features from the browser-related metadata and then extract the browserprint for the browser. As another example, the contact data comprises metadata associated with the client device of the end-user. In this example, the layers of the machine-learning architecture extract various types of features from the metadata, and then extract the deviceprint for the user's telephony device or client device. The types of metadata correspond to the types of end-user devices. For the telephony device, the analytics operations extract the metadata associated with the telephony device (e.g., ANI, telephone number) or telephony channel (e.g., SIP signaling data). Similarly, for the client device, the analytics operations extract the metadata associated with the client device (e.g., MAC address, IP address) or data channel (e.g., router data, switch data, IP packet header data).

When the user registers with the provider system, the analytics operations apply the layers of the machine-learning architecture on enrollment contact data received from an enrollee-user to extract the certain types of enrollment features and corresponding types of enrollment feature vectors (e.g., enrollment voiceprints, enrollment browserprints, enrollment deviceprints). The authentication server stores the enrollment vectors into an authentication database or other database (e.g., analytics database), which are stored in database records associated with the federated ID associated with the particular enrollee-user. During real-time authentication operations, as in the example process 200, the analytics operations apply the layers of the machine-learning architecture on the inbound contact data (e.g., inbound call data) received from an inbound user to extract the certain types of inbound features and corresponding types of inbound feature vectors (e.g., inbound voiceprint, inbound browserprint, inbound deviceprint). To authenticate an inbound user (e.g., inbound caller), the layers of the machine-learning architecture compare the enrollment vectors against the inbound vectors to generate a confidence score or risk score indicating a distance or similarity between the enrollment vectors and the corresponding inbound vectors.

In some embodiments, the server performs a multi-factor authentication operation. The data server or other device (e.g., authentication server) may authenticate the user according to the multi-factor authentication operation and the session record includes data indicating the authentication level (e.g., "MFA_False," "MFA_True"). The telephony server generates the authentication request including the authentication level. In some circumstances, the authentication server determines that the multi-factor authentication operation should be performed for the particular requested operation, but that the multi-factor authentication was not successfully performed ("MFA_False"). In such circumstances, the authentication server transmits instructions to the telephony device or client device for the caller or end-user to perform the multi-factor authentication. In some circumstances, the authentication server determines that the multi-factor authentication operation should be performed for the particular requested operation, and that the multi-factor authentication was successfully performed ("MFA_True"). In such circumstances, the authentication server determines that certain authentication operations are unnecessary.

In operation 211, the telephony server receives authentication response from the authentication server. The authentication response indicates the authentication results (e.g., confidence score, risk score) generated by the authentication server, among other types of information.

In operation 213, the telephony server determines whether to accept or reject the inbound call based upon the authentication response. The authentication results may further include machine-readable instructions for the telephony server, call center agent device, or caller telephony device to perform based upon whether the telephony server accepted or rejected the inbound call. In accepting the inbound call, the telephony server may, for example, permit the inbound call to continue, route the call to the destination for handling the user's requested services (e.g., route to agent, IVR service), or execute the user's requested services. In rejecting the inbound call, the telephony server may, for example, terminate the inbound call, route the inbound call to a secondary queue for further consideration, or execute one or more mitigating operations. Such mitigating operations performed by the telephony server (or other server) include, for example, requesting additional information from the user, or instructing the authentication server and end-user to successfully perform the multi-factor authentication operation.

In some implementations, the telephony server performs the executable instructions indicating whether to permit or reject the inbound call as determined by the authentication server.

In some implementations, the telephony server executes preconfigured software routines that use the data within the authentication response to programmatically permit or reject the inbound call according to the data values within the authentication response. For instance, the telephony server compares the confidence score (or other values) in the authentication score against corresponding thresholds, such as a threshold confidence (or similarity) score or threshold distances, among other factors for determining whether to authenticate, permit, or reject the inbound call.

Additionally or alternatively, the telephony server permits or rejects, or mitigates the call, according to inputs received from the call center's agent device. The authentication response may include instructions for presenting the authentication results (e.g., confidence score) at the graphical user interface of the call center agent. The call center agent may then operate the graphical user interface and input a confirmation input instructing the telephony server whether to permit or reject the inbound call.

FIG. 2B shows certain operations of the process 200 as performed by one or more authentication servers (e.g., analytics server 102, identity server 105). For ease of description, the process 200 operations are described as being performed by one authentication server device, though embodiments may include any number of computing devices that perform the functions of one or more authentications. Moreover, the process 200 operations are described as being performed by the authentication server, though the processes and operations may be performed by, for example, an analytics server and an identity server.

In operation 221, the authentication server receives an auth-trigger notification from the provider's enterprise data server, where the auth-trigger notification includes various information about the communication session between the client device and the data server, including a federated ID and expected or enrolled phone number for the end-user.

For example, the data server transmits the auth-trigger notification indicating a registered enrolled ANI or phone number associated with the end-user for the data communication channel, between the data server and the client device. The auth-trigger notification indicates, for example, that the telephony should expect a call from the phone number: "(310) 555-1212," and that the session involved the end-user associated with the federated ID: "ID_100."

In operation 223, authentication server generates a session data record based on the auth-trigger notification for the client device's data channel session between with the data server over the data channel. The authentication server then stores the new session record into the authentication database.

Using the auth-trigger notification information, the authentication server then generates a database object file (e.g., JSON file) for the new channel session record, and stores the session record into the authentication database. Continuing with the earlier example, the session record would indicating the federated ID: "ID_100" and the associated ANI or phone number "(310) 555-1212."

In some implementations, if the client device and data server perform multi-factor authentication operations. For example, the data server may determine that the requested service or feature requires stepped-up authentication or the user's profile indicates that the user enabled a multi-factor authentication preference in the user's account data. In this example, when the customer reaches the endpoint in the journey and successfully satisfies the multi-factor authentication requirement, then the data server includes an authentication level ("MFA: 'True'") in the auth-trigger notification information.

In some implementations, the authentication server includes a timestamp and a TTL expiration period (e.g., 30 minutes, 60 minutes) in the session record, after which the session record expires. As an example, when the authentication server later references the session record (described in later operation 229), the authentication server confirms whether the session record remains valid or expired.

In operation 225, the authentication server receives an inbound call notification or inbound call data from the provider's telephony server. When the call center receives an inbound call, the inbound call data is captured and forwarded to the telephony server, but one or more devices of the provider system may also send a notification to the authentication server, prompting the authentication server to establish a session ID for the telephony channel and perform one or more analytics operations on the call data. The inbound call data includes, for example, an audio session ID for the inbound phone call over the telephony channel, an audio recording, and telephony metadata for the end-user's telephony device, and the like.

The inbound call data includes various types of data for identifying the end-user, the end-user's telephony device, and for presenting to the call center agent to service the end-user's service requests. Non-limiting examples of the inbound call data includes the inbound phone call (or ANI) of the inbound caller's telephony device; an audio recording or acoustic data containing samples of the caller's voice; user inputs to IVR software executed by the telephony server; and metadata associated with or indicating the caller's telephony device, among other potential types of data.

In some cases, the telephony server receives the inbound call data from a monitoring device that monitors traffic over the telephony communication channels and forwards the inbound call data to the telephony server of the provider system. In such cases, the telephony channels include hardware and software components of telecommunications networks according to telephony-related protocols (e.g., trunks, exchanges, switches, SIP, SS7, POTS, DNIS, ISDN, PSTN, VoIP), where the telephony device includes a landline or mobile telephone. In some cases, the telephony server receives telephony channels include hardware and software components for computer-telephone integration (CTI) or digital telephony protocols (e.g., routers, switches, TCP/IP, VoIP), where the telephony device includes a computer or mobile device executing telephony software, softphone software, teleconferencing software, or integrated telephony software routines of the mobile application.

In operation 227, the authentication server receives an authentication request from the telephony server, instructing the authentication server to executes various IAM operations and analytics operations to identify and authenticate the caller. The IAM operations of the authentication server determine the user federated ID indicated by the client device and/or the user federated ID indicated by the telephony device. The analytics operations of the authentication server applying machine-learning architecture operations against the inbound call data for comparison against enrolled data associated with the federated ID expected from the session record. The authentication request includes inbound call data about the inbound call referenced by the IAM operations (e.g., inbound phone number or ANI of the inbound call data) and the analytics operations (e.g., inbound voice sample recording data, inbound metadata).

The IAM operations of the authentication server determine the user federated ID indicated by the client device and/or the user federated ID indicated by the telephony device. The analytics operations of the authentication server applying machine-learning architecture operations against the inbound call data for comparison against enrolled data associated with the federated ID expected from the session record.

In operation 229, using the inbound call data, the authentication server obtains the session data record stored in the authentication database (in operation 223). As mentioned, the IAM operations include software routines for determining the particular federated IDs associated with the end-user device identifiers (e.g., phone number, ANI, MAC address, IP address). The various authentication operations (e.g., analytics biometrics operations, multi-factor authentication operations) employed by the service provider systems benefit from the federated ID. The IAM operations generally output the federated ID for a given phone number (or other identifier), and forward the federated ID and the associated phone number to the downstream operations. In some cases, the IAM operations query and retrieve the federated ID from a previously stored database record (e.g., session data record). And in some cases, the IAM operations receive a purported federated ID or other identity claims, and the IAM operations confirm whether the purported federated ID successfully authenticates the end-user purporting to be associated with the purported federated ID.

As an example, the IAM operations successfully authenticated the user in the earlier data channel, and stored the federated ID (e.g., ID_100) into the session record of the authentication database. The session record may also include an expected enrolled phone number ("(310) 555-1212") associated with the end-user. The IAM operations may receive an authentication request containing the inbound phone number (e.g., "(310) 555-1212"). The IAM operations query the authentication database for the federated ID(s) listed in the session record(s) associated with the inbound phone number. The IAM operations retrieve the federated ID(s) associated with the inbound phone accordingly.

The IAM operations return the selected federated ID ("ID_100"), among other potential types of data, to the analytics operations. The analytics operations, in turn, query the databases (e.g., analytics database) using the selected federated ID to retrieve various types of enrolled data for authenticating the caller over the telephony channel. The analytics operations retrieve the enrolled vectors and/or enrolled data associated with the selected federated ID against corresponding inbound vectors and/or inbound data generated for the inbound call data or received in the authentication request.

In some cases, multiple federated IDs are associated with multiple expected phone numbers and/or inbound phone number according to the records of the various system databases. The operations of the authentication server (e.g., IAM operations, analytics operations) may establish, exchange, and store a unique session ID for each session occurring through the various communication channels. This session ID may be stored into the session record for a prior session, but may be used to link to the ongoing the IAM operations and analytics operations for a current session. When retrieving the federated IDs associated with the inbound call data, the analytics operations or IAM operations select only those federated IDs associated with the current session ID through the later communication channel (e.g., telephony channel). In this way, the IAM operations may reduce the volume of information and amount data records fed into the analytics operations.

In operation 231, the authentication server generates a confidence score by comparing an enrollee's voiceprint associated with the federated ID against an inbound voiceprint from the inbound call data. The analytics operations generate the confidence score by applying layers of a machine-learning architecture on the inbound call data for the session, where the machine-learning architecture extracts inbound feature vectors for the inbound call data and compares the inbound feature vectors against enrolled feature vectors for the federated ID, as stored in the one or more databases.

The analytics operations include, for example, executing one or more machine-learning architecture layers for extracting certain types of embedding feature vectors for registered enrolled users and inbound contact data from users. The analytics operations apply the layers of the machine-learning architecture on the contact data to extract certain types of features and corresponding types of feature vectors, such as voiceprints, browserprints (sometimes referred to as "browser fingerprints"), or deviceprints (sometimes referred to as "phoneprints"). As an example, the contact data comprises call data that includes voice samples, where the layers of the machine-learning architecture extract low-level acoustic features (e.g., MFCCs) from the voice sample data. In this example, the machine-learning architecture extracts a voiceprint based on the features extracted from the voice sample data. As another example, the contact data comprises metadata associated with the web browser of the client device of the end-user. In this example, the layers of the machine-learning architecture extract various types of features from the browser-related metadata and then extract the browserprint for the browser. As another example, the contact data comprises metadata associated with the client device of the end-user. In this example, the layers of the machine-learning architecture extract various types of features from the metadata, and then extract the deviceprint for the user's telephony device or client device. The types of metadata correspond to the types of end-user devices. For the telephony device, the analytics operations extract the metadata associated with the telephony device (e.g., ANI, telephone number) or telephony channel (e.g., SIP signaling data). Similarly, for the client device, the analytics operations extract the metadata associated with the client device (e.g., MAC address, IP address) or data channel (e.g., router data, switch data, IP packet header data).

When the user registers with the provider system, the analytics operations apply the layers of the machine-learning architecture on enrollment contact data received from an enrollee-user to extract the certain types of enrollment features and corresponding types of enrollment feature vectors (e.g., enrollment voiceprints, enrollment browserprints, enrollment deviceprints). The authentication server stores the enrollment vectors into an authentication database or other database (e.g., analytics database), which are stored in database records associated with the federated ID associated with the particular enrollee-user. During real-time authentication operations, as in the example process 200, the analytics operations apply the layers of the machine-learning architecture on the inbound contact data (e.g., inbound call data) received from an inbound user to extract the certain types of inbound features and corresponding types of inbound feature vectors (e.g., inbound voiceprint, inbound browserprint, inbound deviceprint). To authenticate an inbound user (e.g., inbound caller), the layers of the machine-learning architecture compare the enrollment vectors against the inbound vectors to generate a confidence score or risk score indicating a distance or similarity between the enrollment vectors and the corresponding inbound vectors.

In some embodiments, the server performs a multi-factor authentication operation. The data server or other device (e.g., authentication server) may authenticate the user according to the multi-factor authentication operation and the session record includes data indicating the authentication level (e.g., "MFA_False," "MFA_True"). The telephony server generates the authentication request including the authentication level. In some circumstances, the authentication server determines that the multi-factor authentication operation should be performed for the particular requested operation, but that the multi-factor authentication was not successfully performed ("MFA_False"). In such circumstances, the authentication server transmits instructions to the telephony device or client device for the caller or end-user to perform the multi-factor authentication. In some circumstances, the authentication server determines that the multi-factor authentication operation should be performed for the particular requested operation, and that the multi-factor authentication was successfully performed ("MFA_True"). In such circumstances, the authentication server determines that certain authentication operations are unnecessary.

The authentication server generates an authentication response for the telephony server. The authentication response indicates the authentication results (e.g., confidence score, risk score) generated by the authentication, among other types of information.

In operation 233, the authentication server transmits the authentication response containing the authentication results to the telephony server. The authentication results include, for example, the confidence score generated for the inbound call data associated with the inbound call received over the telephony channel. The authentication response further indicates one or more federated IDs associated the confidence score and/or an indication of the authentication level (e.g., was multi-factor authentication successful).

Figure 3:
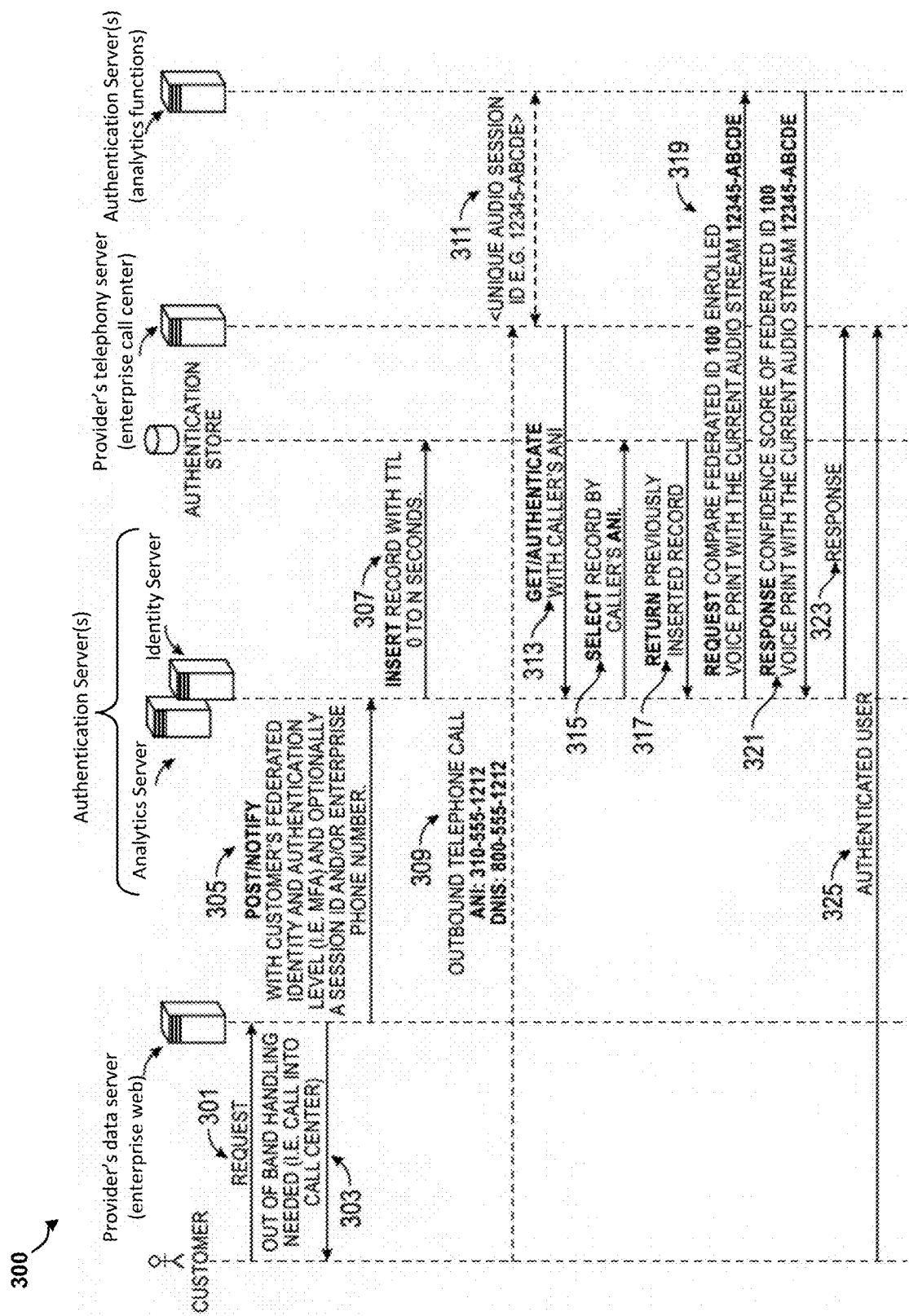
FIG. 3 shows dataflow amongst components of the system for receiving and analyzing voice biometrics and other types of information received via various types of communication channels, according to some embodiments.

FIG. 3 shows operations of a method 300 for receiving and analyzing voice biometrics (and other types of information) received via various types of communication channels, according to an embodiment. Moreover, FIG. 3 depicts dataflow amongst components of a telecommunications system or technical ecosystem during a customer-user's communication journey. For ease of understanding, certain features and functions involve a Federated ID, though embodiments may include any form of intermediate arbitrary ID that each device of the system is preconfigured to ingest and map to another known unique ID. As an example, as shown in TABLE 1 (below), a "tenant_id" field may be an arbitrary identifier value assigned by a call center system or analytics service that may also be used as the value of a "federated_id" field referenced by an identity service. In this non-limiting example, the arbitrary ID of one of call center system or analytics system ("tentant_ID" of "tenant-100") may be repurposed as the Federated ID ("federated_id" of "100"). The intermediate ID may be generated, assigned, or derived for a given contact according to any number of preconfigured operations or correspondence mappings.

In particular, the method 300 includes an omni-channel dataflow in which a user contacts and interacts with a provider service (e.g., bank, hotel, airline) through various communications channels, such as a data channel for mobile application communications, a data channel for browser-to-webserver communications, and a telephony channel for cellular phone communications, among others. The components of the system include various devices for initiating, conducting, and hosting communications with the user, and authenticating the user to establish a user's authenticated session. The system also includes various devices that authenticate the user contacting the provider service and host the user's authenticated session through the various communication channels through which the user may interact with the enterprise. The various devices include, for example, a provider's data server (e.g., provider data server 111*b*) hosting enterprise online or web-based services of a provider service; a provider's server (e.g., telephony server 111*a*) situated at a call center and configured to capture information via a telephony channel; an analytics server of an analytics service; an identity server that executes functions of an external or internal identity service; and an authentication store (e.g., authentication database 107) associated with the identity server, where the authentication store contains various types of data about users, user devices, or omni-channel sessions established between user devices and provider servers (e.g., telephony servers 111*a*, provider data servers 111*b*).

As shown in the method 300, the customer-user's journey begins with using a mobile application executed by a client device to access and interact with a provider's online services, as hosted by the data server. In this example, the user submits a request to confirm the amount of money available in the user's checking account. The client device then transmits one or more types of data for authenticating the user via a data channel for mobile application communications. An authenticated session is established for the user, assuming the user was successfully authenticated by an analytics server. Continuing with this example, the user's journey continues when the user submits a subsequent request to the provider server to initiate a transaction or operation having heightened security requirements (e.g., a funds transfer). In such circumstances, the transaction requested in the first request (e.g., how much money is in the checking account) may be authenticated and authorized using authenticating data gathered entirely through the data channel as an initial form of authentication. For the transaction requested in second request (e.g., transfer funds to another account), the provider data server prompts the user to place a call to the provider's call center to authenticate and confirm the transaction via a telephony channel. Thus, for the second request, the transaction is authenticated and authorized using the authentication that was initially supplied via the data channel and also further authenticating data gathered by the telephony server through the telephony channel. Notably, the authentication that was initially supplied via the data channel can be passively communicated between the various channels, amongst the devices of the system.

In operation 301, the client device accesses, via a data channel, enterprise online services hosted by the provider data server of a provider system. The client device then transmits a first transaction request to the provider data server. The provider data server receives various types of data and metadata from the client device via the data channel and establishes a data-channel session with client device. In some cases, the data server receives data communication from the client device, when the client device requests access to the online services of the provider data server.

In operation 303, the provider server determines that the first transaction request requires out-of-band handling and returns an out-of-band notification to the client device. The out-of-band notification instructs the client device to, for example, contact a call center via a telephony channel. Additionally or alternatively, the out-of-band notification instructs the client device to generate and display a prompt to the customer-caller, via a user interface of the client device, instructing the customer to place a telephone call to the call center via the telephony channel.

The data server receives data inputs from the client device via the data channel and detects a triggering request according to preconfigured triggering instructions in the software programming (e.g., triggering inputs, threshold values, temporal thresholds or expiration timing). Due to detecting the triggering request, the data server determines that an ongoing operational flow or service request (e.g., ongoing chatbot conversation, request to withdraw or transfer funds, generate or update user data) reaches an endpoint requiring the user to switch to another communication channel.

The mobile application or the provider data server may capture, parse, and store certain types of information about the user or client device, such as the caller ANI or other signaling metadata. In some implementations, the mobile application or the data server generates certain types of information about the user or the user device, which may include generating a unique ANI (or phone number) or auto-appending random digits to a dialed number as a session identifier (e.g., 800-555-1212||1234). This information may be included into an auth-trigger notification (as in operation 305, below) or otherwise stored into one or more data records for the user, client device, or communication session.

In operation 305, the data server generates an auth-trigger notification, such as a POST notification in the example method 300 of FIG. 3, containing a federated ID and expected phone number associated with the end-user. The data server transmits the auth-trigger notification to one or more authentication servers, including a computing device configured to perform the various call data analytics and authentication operations described herein (e.g., analytics server 102), and a computing device configured to perform the various IAM operations described herein (e.g., identity server 105). For ease of description, the one or more authentication servers are sometimes described as a single authentication server having integrated functions of both analytics and identity servers, though embodiments may include any number of authentication servers having integrated analytics and identity servers. Embodiments may also include multiple authentication servers that include any number of analytics servers and any number of identity servers. Continuing with operation 305, the authentication server stores the data of the auth-trigger notification into the authentication store as a channel session record associated with the data channel communication session (between the client device and the data server). In some cases, the data server contemporaneously returns the out-of-band channel notification to the client device in response to the detecting the triggering request (as in operation 303).

In some implementations, the auth-trigger notification is provided to the authentication server with the customer's federated ID and an authentication level (e.g., single-factor authentication, multi-factor authentication). Optionally, the auth-trigger notification includes a session ID and/or an enterprise phone number that route, for example, to the provider call center.

In some cases, in the event the journey is from a non-telephony device, such as a desktop web browser or desktop-based softphone telephony software (e.g., Skype®), then the provider data server or authentication server (e.g., analytics server 102) may extract and generate a browser fingerprint or deviceprint for the caller's web browser associated with the caller ANI or softphone application associated with the caller ANI. The authentication server may create a match of browser fingerprints or device prints to ANIs, such that the authentication server may index a given ANI against any known or previously observed browser fingerprint(s) or deviceprint(s). In this way, the authentication server may notionally or logically treat the browser fingerprint or the deviceprint as a form of "digital ANI."

In operation 307, the authentication server generates a channel session record using the data received in the auth-trigger notification and add the session record into the authentication store. The channel session record generated based upon, for example, a database INSERT script query or file (e.g., JSON object) that contains some or all of the data of the auth-trigger notification and instructions for the authentication store to insert and store the channel session record into the non-transitory storage of the authentication store for later reference. The authentication server may assign a Time-to-Live (TTL) interval to the session record for any pre-configured amount of time (e.g., between 0 and N seconds) indicating an amount of time the session record remains valid. An example of the JSON object of the channel session record is shown in TABLE 1 (below).

TABLE 1

```
{
    "auth_id_type": "voice",
    "expires_at": 1652461250,
    "federated_id": "100",
    "mfa": false,
    "phone": "+13105551212",
    "request_id": "7fde4083-749d-40a0-b9df-c0bfa86a54a8",
    "tenant_uid": "tenant-100",
    "timestamp": "2022-05-13 T 16:59:50.616861"
}
```

In operation 309, the user operates and instructs the (same or another) client device to initiate an outbound telephone call to the provider's call center via the telephony channel. The provider's telephony server receives the corresponding inbound call data from the client device via the telephony channel. The inbound call data includes various types of data for identifying the user-caller, the client device, and for presenting to the call center agent to service the user's service requests. Non-limiting examples of the inbound call data includes the inbound phone number (or ANI) of the inbound caller's telephony device (e.g., 310-555-1212); the DNIS associated with the inbound phone call (e.g., 800-555-1212); an audio recording or acoustic data containing samples of the user-caller's voice; user inputs to IVR software executed by the telephony server; and metadata associated with or indicating the user's client device, among other potential types of data.

In some cases, the telephony server receives the inbound call data from a monitoring device of the provider's call center that monitors and captures various types of communication traffic (inbound call data packets) over the telephony channels and forwards the inbound call data to the telephony server. The telephony channels include hardware and software components of telecommunications networks according to telephony-related protocols (e.g., trunks, exchanges, switches, SIP, SS7, POTS, DNIS, ISDN, PSTN, VoIP), where the client device includes, for example, a landline or mobile telephone. In some cases, the telephony server receives telephony channels include hardware and software components for computer-telephone integration (CTI) or digital telephony protocols (e.g., routers, switches, TCP/IP, VoIP), where the client device includes a computer or mobile device executing telephony software, softphone software, teleconferencing software, or integrated telephony software routines of the mobile application.

In operation 311, the telephony server sends an inbound call notification or the inbound call data to the authentication server to perform the various call analytics and authentication functions described herein (e.g., analytics server 102). The authentication server receives an inbound call notification or inbound call data from the provider's telephony server. When the call center receives the inbound call, the inbound call data is captured and forwarded to the telephony server, but one or more devices of the provider system may also send a notification to the authentication server. This notification prompts the authentication server to establish a unique audio session ID (shown as "12345-ABCDE") for the telephony channel communication session and perform one or more analytics operations on the inbound call data. The authentication server may store the audio session ID and other information into one or more databases, such as the authentication store or another database coupled to or hosted by the authentication server(s) (e.g., session database, analytics database 106). Moreover, the inbound call data includes various types of data for identifying the user and/or the client device, and for presenting information about the user or client device to the call center agent in order to service the user's service requests. Non-limiting examples of the inbound call data includes the one or more session IDs; the audio session ID for the inbound phone call over the telephony channel; telephony metadata for the client device, the inbound phone call (or ANI) of the client device; an audio recording or acoustic data containing samples of the user's voice; user inputs to the IVR software executed by the telephony server; and metadata associated with or indicating the user's client device, among other potential types of data.

Continue with the operation 311, the call analytics functions of the authentication server may return the unique audio session ID, among other types of data associated with the ANI of the client device. This data may be used for performing various authentication operations described further below.

In operation 313, the telephony server transmits an authenticate request, or GET request, to the authentication server. The GET request indicates the user's ANI (e.g., the ANI of the user's client device) and prompts the authentication server(s) to perform the various the TAM operations and analytics operations using the inbound call data.

In operation 315, the TAM operations of the authentication server queries the authentication store using the GET request and selects the one or more session records associated with the user's ANI (for the user's session through the data channel). In operation 317, in response to the query, the authentication server returns various types of inbound contact data received via the data channel in the previously inserted authenticated session ID record (as inserted into the authentication store during operation 307). The TAM operations of the authentication server determine the user federated ID indicated by the client device(s) and/or the user federated ID indicated by the session ID record. TABLE 2 (below) shows an example of the previously inserted record that the authentication store returns to the TAM operations.

TABLE 2

```
{
  "auth_id_type": "voice",
  "federated_id": "100",
  "mfa": false,
  "phone": "+13105551212",
  "tenant_uid": "tenant-100",
  "timestamp": "2022-05-13 T 16:59:50.616861"
}
```

The IAM operations include, for example, identifying the federated ID for the inbound user indicated by the inbound data. The IAM operation receives the authentication request containing the phone number, and queries the authentication store for the federated IDs associated with the phone numbers or ANIs in the authentication request. For example, the session record stored into the authentication includes the federated ID ("100") and expected phone number ("(310) 555-1212"). In this example, the telephony server includes the inbound phone number ("(310) 555-1212") in the authentication request submitted to the authentication server. Using the inbound phone number ("(310) 555-1212"), the authentication store returns each of the database records and federated IDs (e.g., "100") associated with the inbound phone number, which in this example, is the same federated ID ("100") in the session record generated for the data channel (in operation 307).

In operation 319, the IAM operations of authentication server(s) sends a request for the analytics operations of the authentication server(s) to compared a federated ID ("100") enrolled voiceprint against the acoustic features of the current call audio stream for the unique audio session ID (as determined in operation 311). The IAM operations return the selected federated ID ("100"), among other potential types of data, to the analytics operations of the authentication server. The analytics operations, in turn, query the databases (e.g., analytics database 106) using the selected federated ID to retrieve various types of enrolled data for authenticating the caller over the telephony channel, and the current call data (and/or current audio stream) associated with the audio session ID ("12345-ABCDE"). The analytics operations retrieve the enrolled vectors and/or enrolled data associated with the selected federated ID against corresponding inbound vectors and/or inbound data generated for the inbound call data or received in the GET request. The analytics operations of the authentication server apply a machine-learning architecture trained for call data analytics and authentication against the inbound call data, which compares the inbound vectors and/or inbound data against enrolled vectors or enrolled data associated with the federated ID expected from the session record.

The analytics operations include, for example, executing one or more machine-learning architecture layers for extracting certain types of embedding feature vectors for registered enrolled users and inbound contact data from users. The analytics operations apply the layers of the machine-learning architecture on the inbound data to extract certain types of features and corresponding types of feature vectors, such as voiceprints, browserprints (sometimes referred to as "browser fingerprints"), or deviceprints (sometimes referred to as "phoneprints"). The features and functions for analytics operations and authentication operations by an analytics server of an analytics service were described previously (e.g., operation 209 of FIG. 2A; operations 227-229 of FIG. 2B) and need not be repeated here.

In operation 321, the analytics operations of the authentication server generate and returns an confidence score for the federated ID ("100") for the current inbound call data (and/or current audio stream) associated with the current audio session ID ("12345-ABCDE"). The authentication server generates a confidence score by comparing an enrollee's voiceprint associated with the federated ID against an inbound voiceprint from the inbound call data. TABLE 3 (below) shows an example of the confidence score data generated by the analytics operations.

TABLE 3

```
{
  "confidence": 0.8675309,
  "identity": 100
}
```

The analytics operations generate the confidence score by applying layers of a machine-learning architecture on the inbound call data for the session, where the machine-learning architecture extracts inbound feature vectors for the inbound call data and compares the inbound feature vectors against enrolled feature vectors for the federated ID, as stored in the one or more databases. The features and functions of analytics operations for generating the confidence score were described previously (e.g., operations 229-231 of FIG. 2B) and need not be repeated here.

In operation 323, the authentication server returns to the telephony server an authentication response corresponding to the GET authentication request (as in operation 313). The authentication response indicates the authentication results (e.g., confidence score, risk score) generated by the authentication server, among other types of information. The authentication results include, for example, an authentication timestamp, the confidence score generated for the inbound call data associated with the inbound call received over the telephony channel. The authentication response further indicates one or more federated IDs associated the confidence score and/or an indication of the authentication level (e.g., was multi-factor authentication successful). TABLE 4 (below) shows an example of the response data of the authentication results.

TABLE 4

```
{
  "auth_ts": "2022-05-13 T 16:59:50.616861",
  "confidence": 0.8675309,
  "identity": 100,
  "mfa": false
}
```

In operation 325, the telephony server determines whether to accept or reject the inbound call based upon the authentication response. The authentication results may further include machine-readable instructions for the telephony server, call center agent device, or caller telephony device to perform based upon whether the telephony server accepted or rejected the inbound call. In accepting the inbound call, the telephony server may, for example, permit the inbound call to continue, route the call to the destination for handling the user's requested services (e.g., route to agent, IVR service), or execute the user's requested services. In rejecting the inbound call, the telephony server may, for example, terminate the inbound call, route the inbound call to a secondary queue for further consideration, or execute one or more mitigating operations. Such mitigating operations performed by the telephony server (or other server) include, for example, requesting additional information from the user, or instructing the authentication server and end-user to successfully perform the multi-factor authentication operation. The features and functions of the telephony server handling the inbound call based upon the authentication response were described previously (e.g., operations 213 of FIG. 2A; operation 233 of FIG. 2B) and need not be repeated here. Based on the confidence score, the telephony server routes the inbound call associated with the inbound call data to one or more agent devices, or other type of destination device for the inbound call and the inbound call data. In some implementations, when the telephony server (or other computing device of the provider computing network) routes the inbound call to an agent device, the telephony server transmits machine-readable instructions and various types of data for presenting an authentication results user interface at the agent device or other type of user destination computing device. The authentication results user interface is configured to display the authentication results at the agent device for review by review an administrator or user of the provider's enterprise call center. The authentication results interface displays, for example, the confidence score or risk score, the inbound call data, and the enrolled user data, among other types of information for review by the user of the provider call center.

In some embodiments, an authentication server (e.g., analytics server, identity server) performs various authentication operations using a federated identifier, which may include an intermediate identifier. A non-limiting example of such embodiment may be found in FIG. 2B.

For instance, in some embodiments, a computer-implemented method comprises receiving, by a computer, an auth-trigger notification from a data server of an enterprise service provider network, the auth-trigger notification including an intermediate identifier associated with an end-user and an enrolled phone number expected for a telephony device associated with the end-user; generating, by the computer, a session record including the intermediate identifier and the enrolled phone number; receiving, by the computer from a telephony server of the enterprise service provider network, inbound call data for an inbound call and an authentication request for an inbound call; generating, by the computer, an inbound voiceprint for the inbound call by applying a machine-learning architecture on the inbound call data; and generating, by the computer, a confidence score for the inbound call based upon a distance between a stored enrolled voiceprint associated with the intermediate identifier and the inbound voiceprint.

In some implementations, the auth-trigger notification including the intermediate identifier is associated with an authenticated session for the end-user via a data channel.

In some implementations, the method includes transmitting, by the computer, the confidence score to an agent device of the enterprise service provider network.

In some implementations, the authentication request includes the inbound call data containing an inbound phone number and inbound voice sample data for generating the inbound voiceprint.

In some implementations, the method includes, in response to receiving the authentication request, obtaining, by the computer, the session record having the enrolled phone number matching an inbound phone number by querying the authentication database using the intermediate identifier of the session record.

In some implementations, the method includes, in response to receiving the authentication request, obtaining, by the computer, the stored enrolled voiceprint from a second database by querying the second database for the enrolled voiceprint associated with the intermediate identifier.

In some implementations, generating the session record includes storing, by the computer, the session record into an authentication database.

In some implementations, the method includes receiving, by the computer, from the telephony server, an inbound call notification for the inbound call containing the inbound call data; and generating, by the computer, an audio session identifier associated with the inbound call data and the intermediary identifier.

In some implementations, the method includes applying, by the computer, the machine-learning architecture on the inbound call data to generate at least one of an inbound deviceprint or an inbound browser fingerprint for the telephony device associated with the end-user. The computer generates the confidence score for the inbound call further based upon the distance between the at least one of the inbound deviceprint or the inbound browser fingerprint and at least one of a stored enrolled deviceprint or a stored enrolled browser fingerprint associated with the intermediate identifier.

In some implementations, the computer comprises an authentication server including at least one of an analytics server or an identity server.

In some embodiments, a system comprises an authentication server comprising a processor and configured to: receive an auth-trigger notification from a data server of an enterprise service provider network, the auth-trigger notification including an intermediate identifier associated with an end-user and an enrolled phone number expected for a telephony device associated with the end-user; generate a session record including the intermediate identifier and the enrolled phone number; receive, from a telephony server of the enterprise service provider network, inbound call data for an inbound call and an authentication request for an inbound call; generate an inbound voiceprint for the inbound call by applying a machine-learning architecture on the inbound call data; and generate a confidence score for the inbound call based upon a distance between a stored enrolled voiceprint associated with the intermediate identifier and the inbound voiceprint.

In some implementations, the auth-trigger notification including the intermediate identifier is associated with an authenticated session for the end-user via a data channel.

In some implementations, the authentication server is further configured to transmit the confidence score to an agent device of the enterprise service provider network.

In some implementations, the authentication request includes the inbound call data containing an inbound phone number and inbound voice sample data for generating the inbound voiceprint.

In some implementations, the authentication server is further configured to, in response to receiving the authentication request, obtain the session record having the enrolled phone number matching an inbound phone number by querying the authentication database using the intermediate identifier of the session record.

In some implementations, the authentication server is further configured to, in response to receiving the authentication request, obtain the stored enrolled voiceprint from a second database by querying the second database for the enrolled voiceprint associated with the intermediate identifier.

In some implementations, when generating the session record the authentication server is further configured to store the session record into an authentication database.

In some implementations, authentication server is further configured to receive from the telephony server, an inbound call notification for the inbound call containing the inbound call data; and generating, by the computer, an audio session identifier associated with the inbound call data and the intermediary identifier.

In some implementations, authentication server is further configured to apply the machine-learning architecture on the inbound call data to generate at least one of an inbound deviceprint or an inbound browser fingerprint for the telephony device associated with the end-user. The authentication server generates the confidence score for the inbound call further based upon the distance between the at least one of the inbound deviceprint or the inbound browser fingerprint and at least one of a stored enrolled deviceprint or a stored enrolled browser fingerprint associated with the intermediate identifier.

In some implementations, the authentication server includes an identity server.

In some embodiments, one or more provider servers (e.g., provider data server, telephony server) requests authentication for inbound contacts, where the authentication processes implement a federated identifier, which may include an intermediate identifier. A non-limiting example of such embodiment may be found in FIG. 2A.

For instance, in some embodiments, a computer-implemented method comprises receiving, by a data server associated with an enterprise service provider network, authenticating information for an end-user from a client device via a data channel; transmitting, by the data server, to an authentication server associated with an authentication database, an auth-trigger notification including an intermediate identifier for the end-user associated with the data channel; receiving, by a telephony server associated with the enterprise service provider network, inbound call data from a caller device via a telephony channel; transmitting, by a telephony server associated with the enterprise service provider network, to the authentication server an authentication request including inbound call data received via the telephony channel; and receiving, by the telephony server from the authentication server, an authentication response containing authentication results including a confidence score indicating a distance between an enrolled voiceprint associated with the intermediate identifier for the end-user associated with the data channel and an inbound voiceprint generated for the inbound call data received via the telephony channel.

In some implementations, the auth-trigger notification includes the intermediate identifier associated with the end-user and an enrolled phone number expected for the end-user via a telephony channel.

In some implementations, the inbound call data includes an inbound phone number associated with the caller device and inbound voice sample data for generating the inbound voiceprint.

In some implementations, the method includes detecting, by the data server, a triggering transaction request for the data channel indicating an endpoint for a communication session between the client device and the data server for the data channel.

In some implementations, the method includes receiving, by the data server, a transaction request from the client device via the data channel; determining, by the data server, that the transaction request satisfies a triggering condition for a second channel of authentication; and transmitting, by the data server to the client device via the data channel, authentication instructions for the second channel of authentication.

In some implementations, the authentication instructions include a prompt for display at a user interface of the client device.

In some implementations, the authentication instructions include executable instructions for generating the inbound call data at the caller device.

In some implementations, the method includes routing, by the telephony server, an inbound call associated with the inbound call data based upon the confidence score received from the authentication server.

In some implementations, the telephony server routes the inbound call to an agent device and transmits a results interface for displaying the authentication results at the agent device.

In some implementations, the confidence score further indicates the distance between at least one of an inbound deviceprint or an inbound browser fingerprint and at least one of a stored enrolled deviceprint or a stored enrolled browser fingerprint associated with the intermediate identifier.

In some embodiments, a system comprises a data server and a telephony server associated with an enterprise service provider network, each comprising a respective processor. The data server is configured to receive authenticating information for an end-user from a client device via a data channel; and transmit to an authentication server associated with an authentication database, an auth-trigger notification including an intermediate identifier for the end-user associated with the data channel. The telephony server is configured to receive inbound call data from a caller device via a telephony channel; transmit to the authentication server an authentication request including inbound call data received via the telephony channel; and receive, from the authentication server, an authentication response containing authentication results including a confidence score indicating a distance between an enrolled voiceprint associated with the intermediate identifier for the end-user associated with the data channel and an inbound voiceprint generated for the inbound call data received via the telephony channel.

In some implementations, the auth-trigger notification includes the intermediate identifier associated with the end-user and an enrolled phone number expected for the end-user via the telephony channel.

In some implementations, the inbound call data includes an inbound phone number associated with the caller device and inbound voice sample data for generating the inbound voiceprint.

In some implementations, the data server is configured to detect a triggering transaction request for the data channel indicating an endpoint for a communication session between the client device and the data server for the data channel.

In some implementations, the data server is configured to receive a transaction request from the client device via the data channel; determine that the transaction request satisfies a triggering condition for a second channel of authentication; and transmit, to the client device via the data channel, authentication instructions for the second channel of authentication.

In some implementations, the authentication instructions include a prompt for display at a user interface of the client device.

In some implementations, the authentication instructions include executable instructions for generating the inbound call data at the caller device.

In some implementations, the data server is configured to route an inbound call associated with the inbound call data based upon the confidence score received from the authentication server.

In some implementations, the telephony server is configured to route the inbound call to an agent device and transmit a results interface for displaying the authentication results at the agent device.

In some implementations, the confidence score further indicates the distance between at least one of an inbound deviceprint or an inbound browser fingerprint and at least one of a stored enrolled deviceprint or a stored enrolled browser fingerprint associated with the intermediate identifier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, an auth-trigger notification from a data server of an enterprise service provider network, the auth-trigger notification including an intermediate identifier associated with an end-user and an enrolled phone number expected for a telephony device associated with the end-user;
generating, by the computer, a session record including the intermediate identifier and the enrolled phone number;
receiving, by the computer from a telephony server of the enterprise service provider network, inbound call data for an inbound call and an authentication request for an inbound call;
generating, by the computer, an inbound voiceprint for the inbound call by applying a machine-learning architecture on the inbound call data; and
generating, by the computer, a confidence score for the inbound call based upon a distance between a stored enrolled voiceprint associated with the intermediate identifier and the inbound voiceprint and a distance between at least one of a stored enrolled deviceprint or a stored enrolled browser fingerprint associated with the intermediate identifier and at least one of an inbound deviceprint or an inbound browser fingerprint.

2. The method according to claim 1, wherein the auth-trigger notification including the intermediate identifier is associated with an authenticated session for the end-user via a data channel.

3. The method according to claim 1, further comprising transmitting, by the computer, the confidence score to an agent device of the enterprise service provider network.

4. The method according to claim 1, wherein the authentication request includes the inbound call data containing an inbound phone number and inbound voice sample data for generating the inbound voiceprint.

5. The method according to claim 1, further comprising, in response to receiving the authentication request, obtaining, by the computer, the session record having the enrolled phone number matching an inbound phone number by querying the authentication database using the intermediate identifier of the session record.

6. The method according to claim 1, further comprising, in response to receiving the authentication request, obtaining, by the computer, the stored enrolled voiceprint from a second database by querying the second database for the enrolled voiceprint associated with the intermediate identifier.

7. The method according to claim 1, wherein generating the session record includes storing, by the computer, the session record into an authentication database.

8. The method according to claim 1, further comprising:
receiving, by the computer, from the telephony server, an inbound call notification for the inbound call containing the inbound call data; and
generating, by the computer, an audio session identifier associated with the inbound call data and the intermediary identifier.

9. The method according to claim 1, further comprising:
applying, by the computer, the machine-learning architecture on the inbound call data to generate the at least one of the inbound deviceprint or the inbound browser fingerprint for the telephony device associated with the end-user.

10. The method according to claim 1, wherein the computer comprises an authentication server including at least one of an analytics server or an identity server.

11. A system comprising:
a computer comprising a processor, the computer configured to:
receive an auth-trigger notification from a data server of an enterprise service provider network, the auth-trigger notification including an intermediate identifier associated with an end-user and an enrolled phone number expected for a telephony device associated with the end-user;
generate a session record including the intermediate identifier and the enrolled phone number;
receive, from a telephony server of the enterprise service provider network, inbound call data for an inbound call and an authentication request for an inbound call;
generate an inbound voiceprint for the inbound call by applying a machine-learning architecture on the inbound call data; and
generate a confidence score for the inbound call based upon a distance between a stored enrolled voiceprint associated with the intermediate identifier and the inbound voiceprint and a distance between at least one of a stored enrolled deviceprint or a stored enrolled browser fingerprint associated with the intermediate identifier and at least one of an inbound deviceprint or an inbound browser fingerprint.

12. The system according to claim 11, wherein the auth-trigger notification including the intermediate identifier is associated with an authenticated session for the end-user via a data channel.

13. The system according to claim 11, the computer is further configured to transmit the confidence score to an agent device of the enterprise service provider network.

14. The system according to claim 11, wherein the authentication request includes the inbound call data containing an inbound phone number and inbound voice sample data for generating the inbound voiceprint.

15. The system according to claim 11, the computer is further configured to, in response to receiving the authentication request, obtain the session record having the enrolled phone number matching an inbound phone number by querying the authentication database using the intermediate identifier of the session record.

16. The system according to claim 11, the computer is further configured to, in response to receiving the authentication request, obtain the stored enrolled voiceprint from a second database by querying the second database for the enrolled voiceprint associated with the intermediate identifier.

17. The system according to claim 11, wherein when generating the session record the computer is further configured to store the session record into an authentication database.

18. The system according to claim 11, wherein the computer is further configured to:
receive, from the telephony server, an inbound call notification for the inbound call containing the inbound call data; and
generate an audio session identifier associated with the inbound call data and the intermediary identifier.

19. The system according to claim 11, wherein the computer is further configured to:
apply the machine-learning architecture on the inbound call data to generate the at least one of the inbound deviceprint or the inbound browser fingerprint for the telephony device associated with the end-user.

20. The system according to claim 11, wherein the computer comprises an authentication server including at least one of an analytics server or an identity server.

* * * * *